(12) United States Patent
Shimada et al.

(10) Patent No.: US 12,321,803 B2
(45) Date of Patent: Jun. 3, 2025

(54) RFID TAG

(71) Applicant: DAIO PAPER CORPORATION, Ehime (JP)

(72) Inventors: Takuro Shimada, Kagawa (JP); Ryota Kondo, Ehime (JP); Taro Ikawa, Ehime (JP); Daiji Matsunoshita, Kanagawa (JP)

(73) Assignee: DAIO PAPER CORPORATION, Ehime (JP)

( * ) Notice: Subject to any disclaimer, the term of this patent is extended or adjusted under 35 U.S.C. 154(b) by 270 days.

(21) Appl. No.: 17/756,007

(22) PCT Filed: Nov. 11, 2020

(86) PCT No.: PCT/JP2020/042125
§ 371 (c)(1),
(2) Date: May 13, 2022

(87) PCT Pub. No.: WO2021/100576
PCT Pub. Date: May 27, 2021

(65) Prior Publication Data
US 2022/0391658 A1     Dec. 8, 2022

(30) Foreign Application Priority Data

Nov. 19, 2019   (JP) ................. 2019-209103

(51) Int. Cl.
| | | |
|---|---|---|
| G06K 19/077 | (2006.01) | |
| H01Q 1/38 | (2006.01) | |
| H01Q 7/00 | (2006.01) | |

(52) U.S. Cl.
CPC .  *G06K 19/07775* (2013.01); *G06K 19/07758* (2013.01); *G06K 19/07786* (2013.01); *H01Q 1/38* (2013.01); *H01Q 7/00* (2013.01)

(58) Field of Classification Search
CPC ....... G06K 19/07775; G06K 19/07758; G06K 19/07786; G06K 19/07771;
(Continued)

(56) References Cited

U.S. PATENT DOCUMENTS

| | | | | |
|---|---|---|---|---|
| 5,912,622 A | * | 6/1999 | Endo .................. | G08B 13/2437 29/846 |
| 6,229,444 B1 | * | 5/2001 | Endo .................. | G08B 13/2437 340/572.1 |

(Continued)

FOREIGN PATENT DOCUMENTS

| | | |
|---|---|---|
| CN | 104866889 A | 8/2015 |
| CN | 103430193 B | 6/2017 |

(Continued)

OTHER PUBLICATIONS

Extended European Search Report for 20890476.3 mailed on Nov. 22, 2023.
(Continued)

*Primary Examiner* — Curtis J King
(74) *Attorney, Agent, or Firm* — IPUSA, PLLC

(57) ABSTRACT

A radio frequency identification (RFID) tag includes an inlay; a magnetic sheet laminated on an attachment object side of the inlay; and a spacer layer disposed between the magnetic sheet and the attachment object. The inlay includes an IC chip configured to store identification information, a loop conductor connected to the IC chip, and an antenna unit connected to the loop conductor.

16 Claims, 15 Drawing Sheets

(58) Field of Classification Search
CPC ...... G06K 19/07794; H01Q 1/38; H01Q 7/00; H01Q 1/2225; H01Q 9/24
See application file for complete search history.

(56) References Cited

U.S. PATENT DOCUMENTS

| | | | | |
|---|---|---|---|---|
| 6,285,284 | B1* | 9/2001 | Soe | G08B 13/246 340/572.1 |
| 6,624,536 | B1* | 9/2003 | Sawada | H01Q 7/00 307/91 |
| 7,106,173 | B2* | 9/2006 | Scott | G06K 19/0723 340/572.1 |
| 7,117,581 | B2* | 10/2006 | Arneson | H01L 21/56 257/E23.064 |
| 7,439,928 | B2* | 10/2008 | Forster | H01Q 1/2225 343/895 |
| 7,439,933 | B2* | 10/2008 | Uesaka | H01Q 9/27 235/492 |
| 7,515,052 | B2* | 4/2009 | Dixon | G06K 19/07749 340/572.1 |
| 7,516,901 | B2* | 4/2009 | Yamagajo | G06K 19/07372 235/492 |
| 7,893,813 | B2* | 2/2011 | Nikitin | G06K 19/0723 235/491 |
| 7,948,384 | B1* | 5/2011 | Kennedy | G06Q 10/00 235/492 |
| 7,971,336 | B2* | 7/2011 | Hanhikorpi | G06K 19/0775 29/601 |
| 8,115,595 | B2* | 2/2012 | Ryoo | G06K 7/10366 340/10.41 |
| 8,371,509 | B2* | 2/2013 | Bohn | G06K 19/07756 235/488 |
| 8,493,183 | B2* | 7/2013 | Yamagajp | H01Q 1/38 343/866 |
| 8,582,307 | B2* | 11/2013 | Yu | H01Q 1/22 361/736 |
| 8,624,740 | B2* | 1/2014 | Sweeney | G06K 19/07345 235/451 |
| 8,797,148 | B2* | 8/2014 | Kato | H01Q 1/2208 340/572.1 |
| 8,830,066 | B2* | 9/2014 | Chen | H01Q 1/2225 340/572.1 |
| 8,878,652 | B2* | 11/2014 | Tsirline | H01Q 1/2225 340/10.2 |
| 8,973,832 | B2* | 3/2015 | Matsumura | G06K 19/07749 340/572.1 |
| 11,948,038 | B2* | 4/2024 | Kato | G06K 19/0723 |
| 2002/0135481 | A1* | 9/2002 | Conwell | G08B 13/2448 340/568.1 |
| 2006/0158380 | A1* | 7/2006 | Son | H01Q 1/2225 343/866 |
| 2006/0214801 | A1* | 9/2006 | Murofushi | H01Q 1/22 340/572.7 |
| 2006/0244606 | A1* | 11/2006 | Li | H01Q 9/28 340/572.7 |
| 2006/0289525 | A1* | 12/2006 | Hovorka | H05B 6/763 219/737 |
| 2007/0046475 | A1* | 3/2007 | Carrender | G08B 13/24 340/572.7 |
| 2007/0126586 | A1* | 6/2007 | Ohtaka | G06K 19/07749 343/750 |
| 2007/0128774 | A1* | 6/2007 | Yamada | H01L 29/78603 438/149 |
| 2007/0164868 | A1* | 7/2007 | Deavours | H01Q 9/0407 343/700 MS |
| 2007/0216591 | A1* | 9/2007 | Tsirline | G06K 7/10316 340/10.2 |
| 2008/0018479 | A1 | 1/2008 | Hashimoto et al. | |
| 2008/0143535 | A1* | 6/2008 | Fischer | H01Q 1/2225 340/572.7 |
| 2009/0009337 | A1* | 1/2009 | Rofougaran | G06K 19/07749 340/572.7 |
| 2009/0079574 | A1* | 3/2009 | Oroku | G06K 19/07749 340/572.7 |
| 2009/0278690 | A1* | 11/2009 | Degani | G06K 19/07749 340/572.1 |
| 2009/0289341 | A1* | 11/2009 | Yamazaki | G06K 19/07735 257/679 |
| 2009/0322634 | A1* | 12/2009 | Yun | H01Q 1/2208 343/866 |
| 2010/0060457 | A1* | 3/2010 | Burnside | H01Q 21/005 343/810 |
| 2010/0134291 | A1* | 6/2010 | Lavedas | H01Q 1/2225 340/572.7 |
| 2010/0214177 | A1* | 8/2010 | Parsche | H01Q 1/2208 343/702 |
| 2010/0231482 | A1 | 9/2010 | Yoshida et al. | |
| 2010/0308965 | A1* | 12/2010 | Weitzhandler | G06K 19/07771 235/493 |
| 2011/0253989 | A1* | 10/2011 | Ullmann | H10K 59/1216 257/40 |
| 2012/0039560 | A1* | 2/2012 | Mazur | G02F 3/024 385/2 |
| 2012/0175491 | A1 | 7/2012 | Chen et al. | |
| 2012/0182147 | A1* | 7/2012 | Forster | H01Q 1/2225 340/572.7 |
| 2015/0019892 | A1 | 1/2015 | Agrawal et al. | |
| 2015/0090801 | A1 | 4/2015 | Omura | |
| 2015/0178613 | A1* | 6/2015 | Hoelzl | G06K 19/07771 156/280 |
| 2015/0263437 | A1* | 9/2015 | Yagi | H01Q 1/2216 343/729 |
| 2018/0157955 | A1 | 6/2018 | Forster | |
| 2019/0109617 | A1 | 4/2019 | Omori et al. | |
| 2021/0216843 | A1* | 7/2021 | Mochizuki | G06K 19/0776 |
| 2022/0398389 | A1* | 12/2022 | Hasegawa | G06K 7/10316 |

FOREIGN PATENT DOCUMENTS

| | | |
|---|---|---|
| CN | 209199155 U | 8/2019 |
| DE | 102005031579 | 1/2007 |
| DE | 202009012901 | 2/2010 |
| EP | 2302567 | 11/2015 |
| JP | 2001-331772 | 11/2001 |
| JP | 2006-013976 | 1/2006 |
| JP | 2006-268349 | 10/2006 |
| JP | 2009-135867 | 6/2009 |
| JP | 2009-230501 | 10/2009 |
| JP | 2010-218537 | 9/2010 |
| JP | 2012-059015 | 3/2012 |
| JP | 2016-82375 | 5/2016 |

OTHER PUBLICATIONS

International Search Report for PCT/JP2020/042125 mailed on Feb. 9, 2021.
Mikiko Fukase et al., "Development of Magnetic Sheet for UHF Band RFID On-Metal Tag", DENKI-SEIKO, vol. 82, No. 1, pp. 23-30, 2011.
Taiwanese Office Action for 109140256 mailed on Apr. 26, 2024.

* cited by examiner

FIG.12
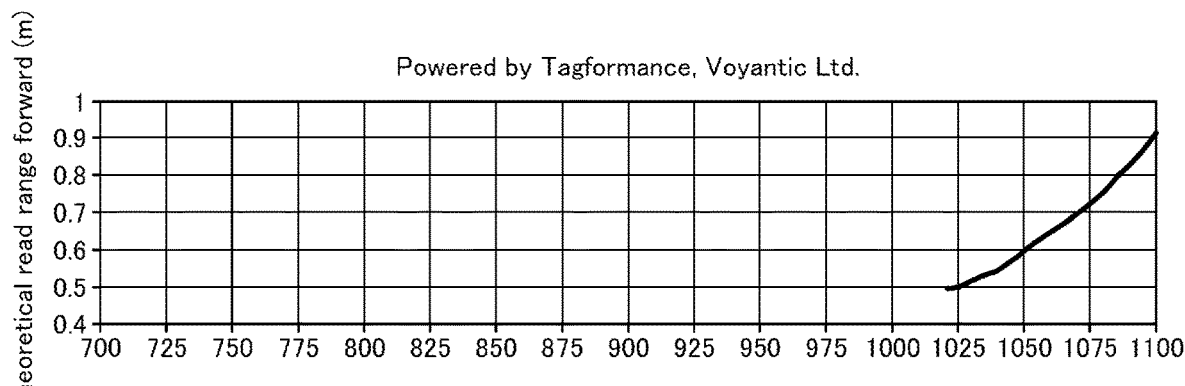
(a)
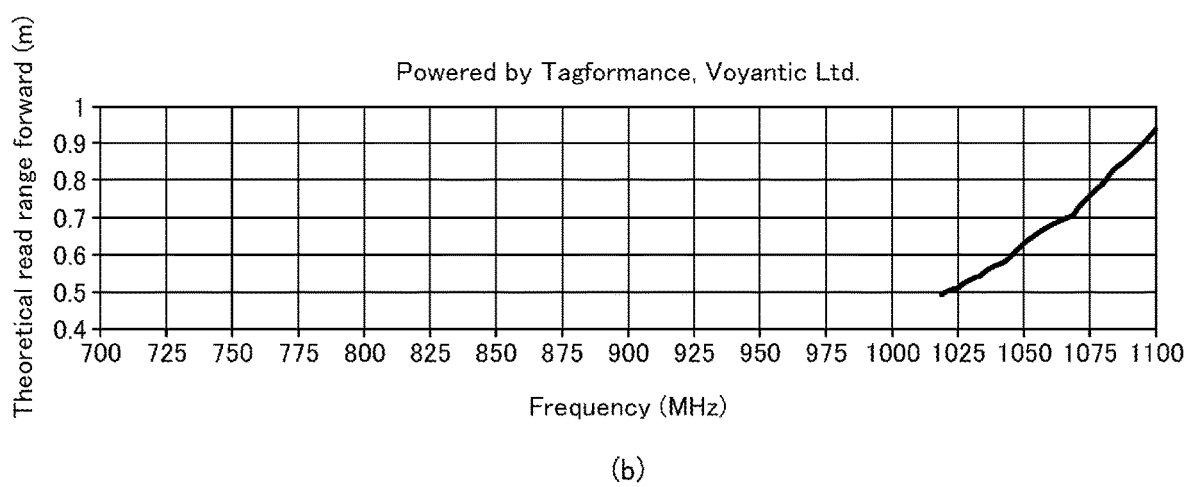
(b)
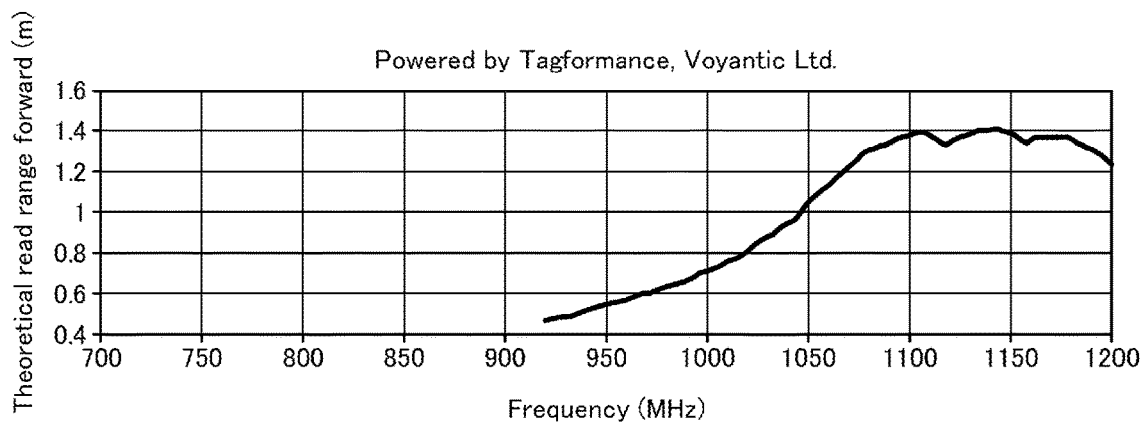
(c)

FIG.13
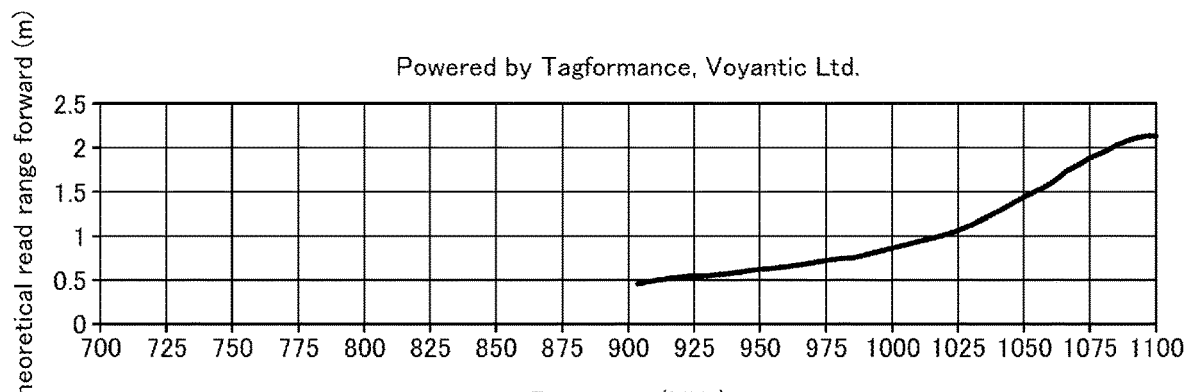
(a)
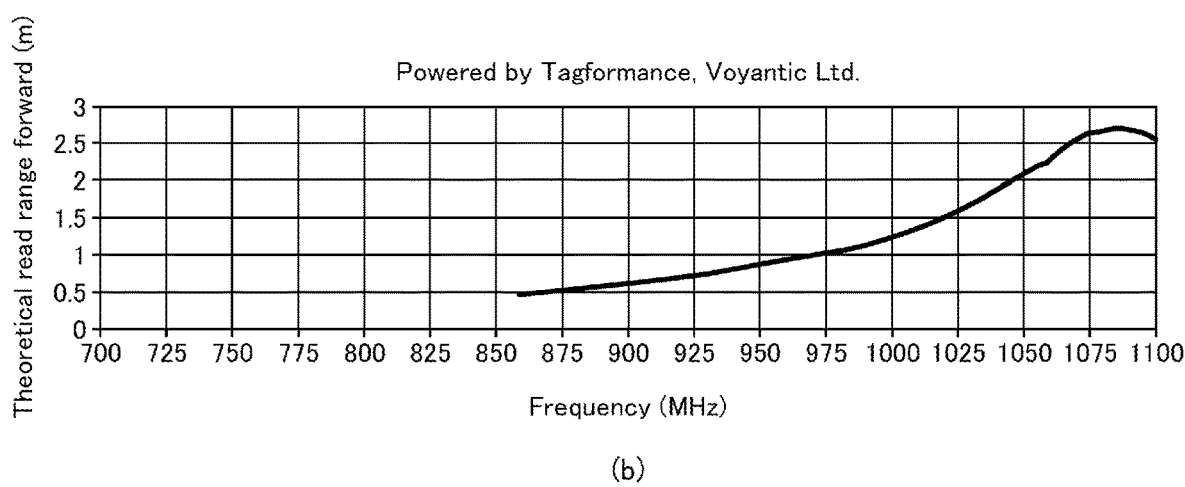
(b)
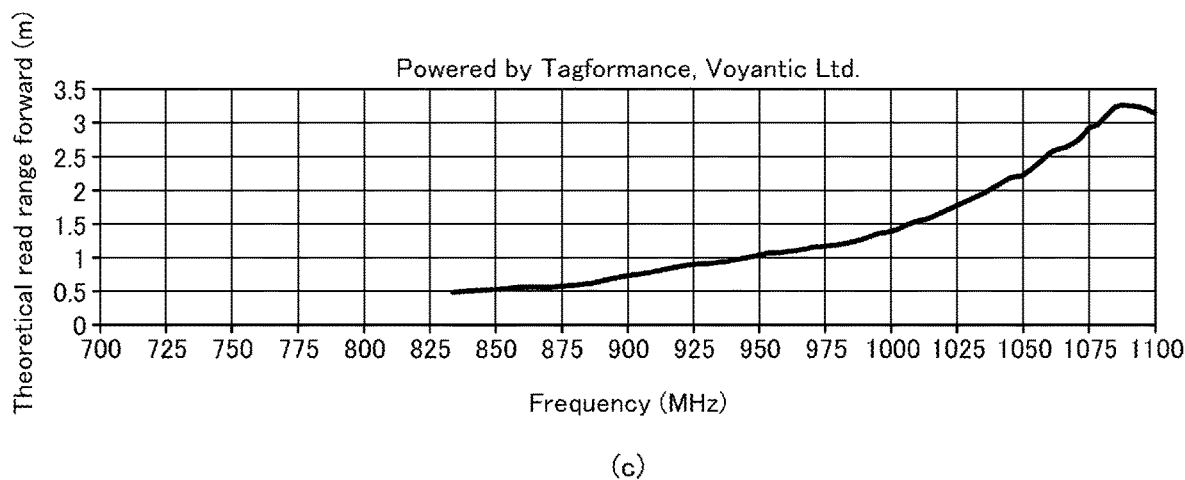
(c)

FIG.14
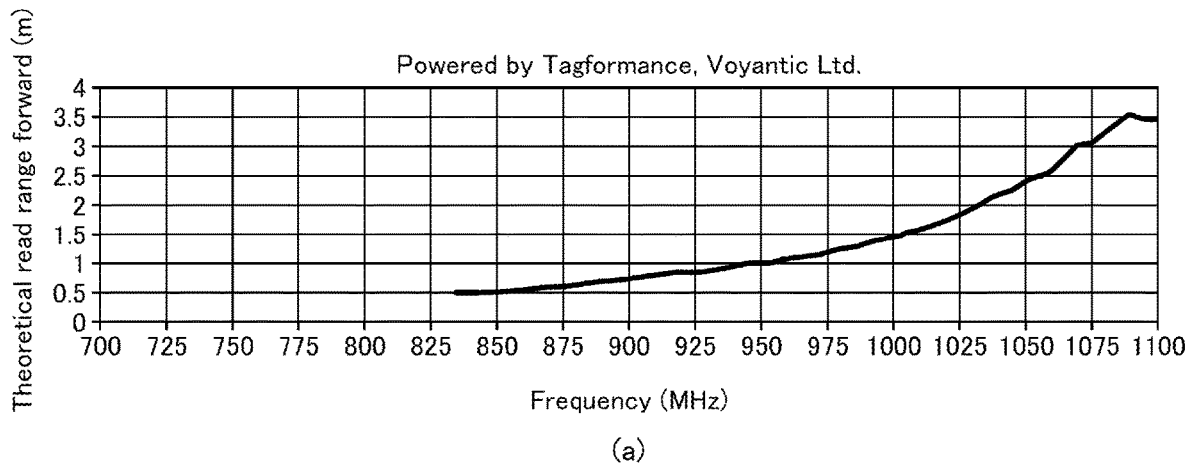
(a)
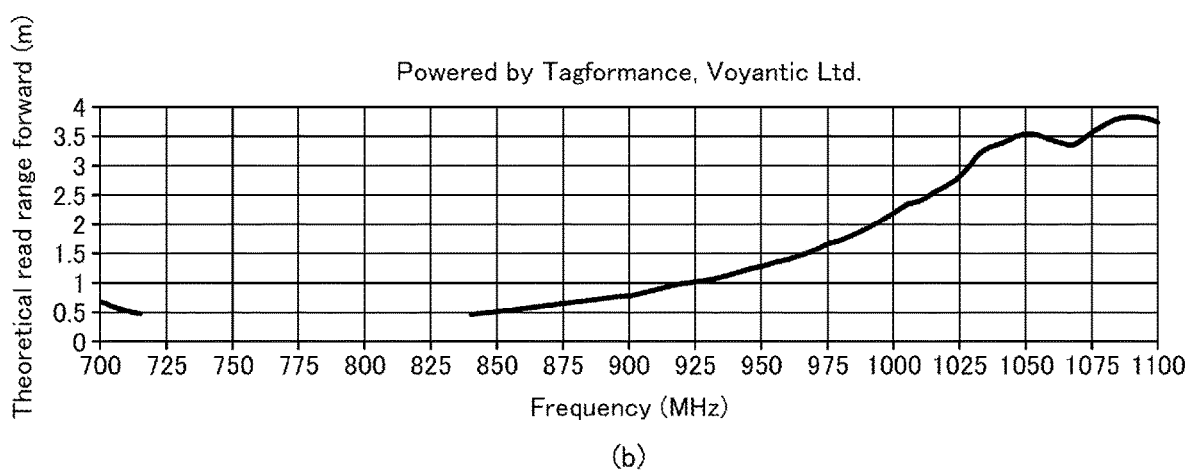
(b)
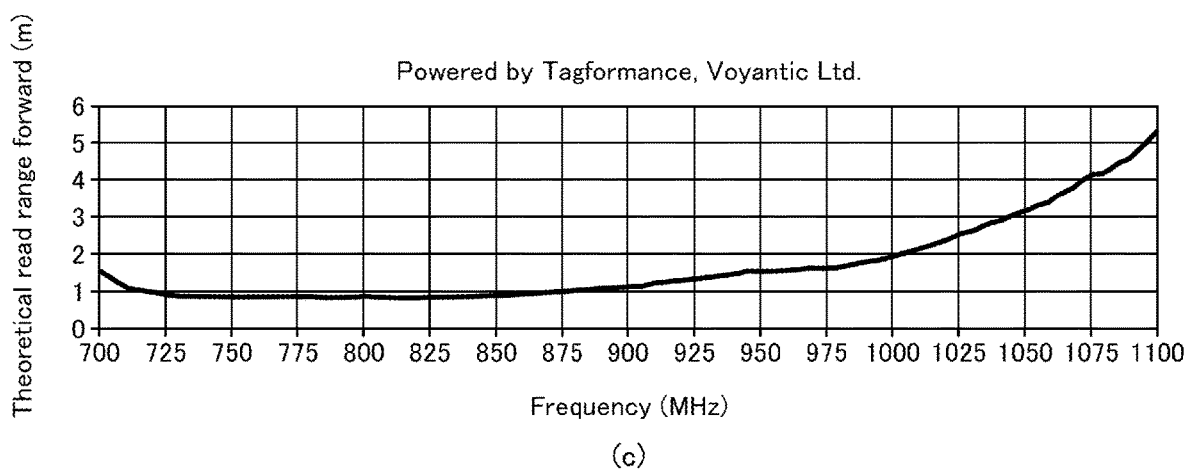
(c)

FIG.15
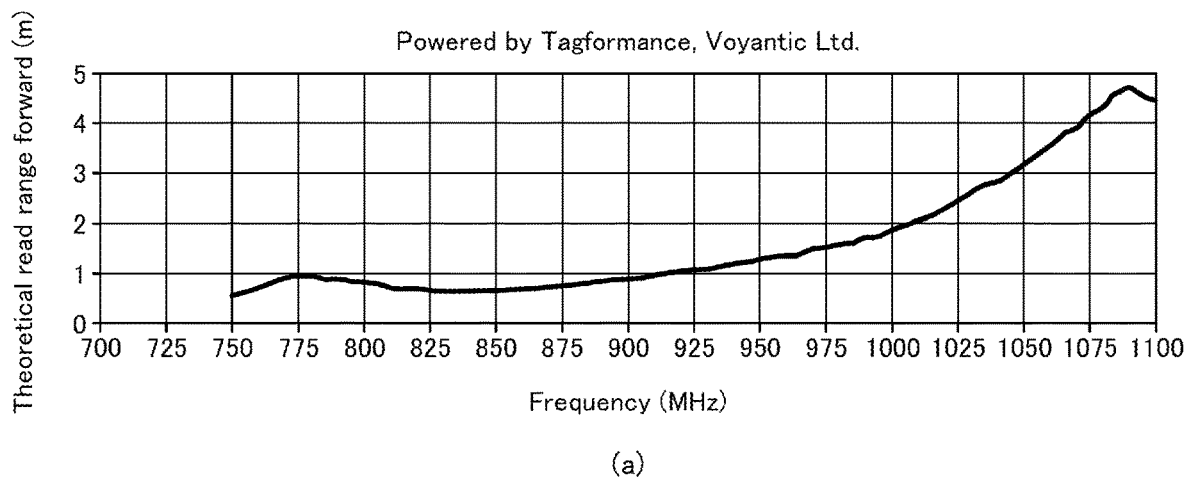
(a)
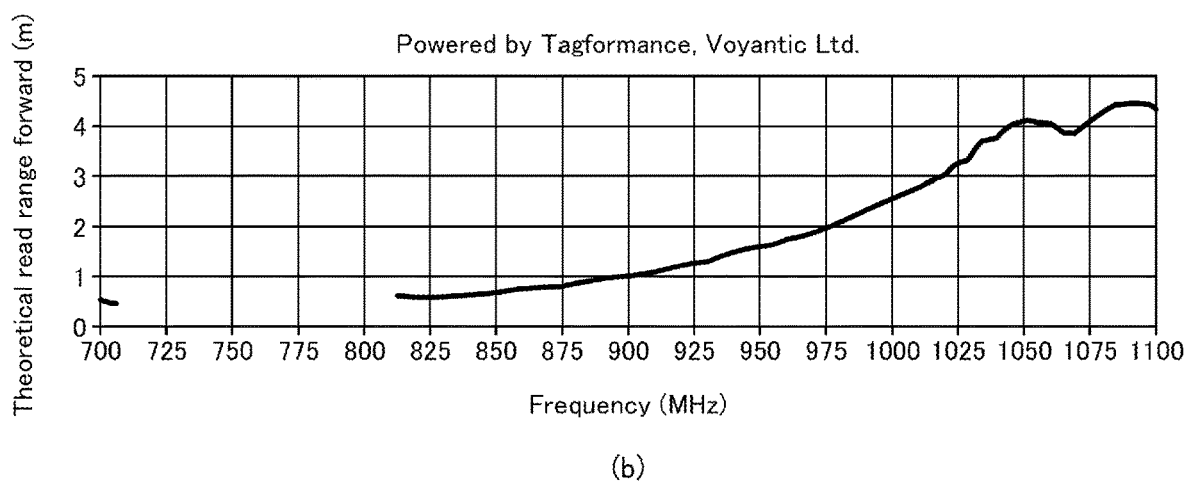
(b)
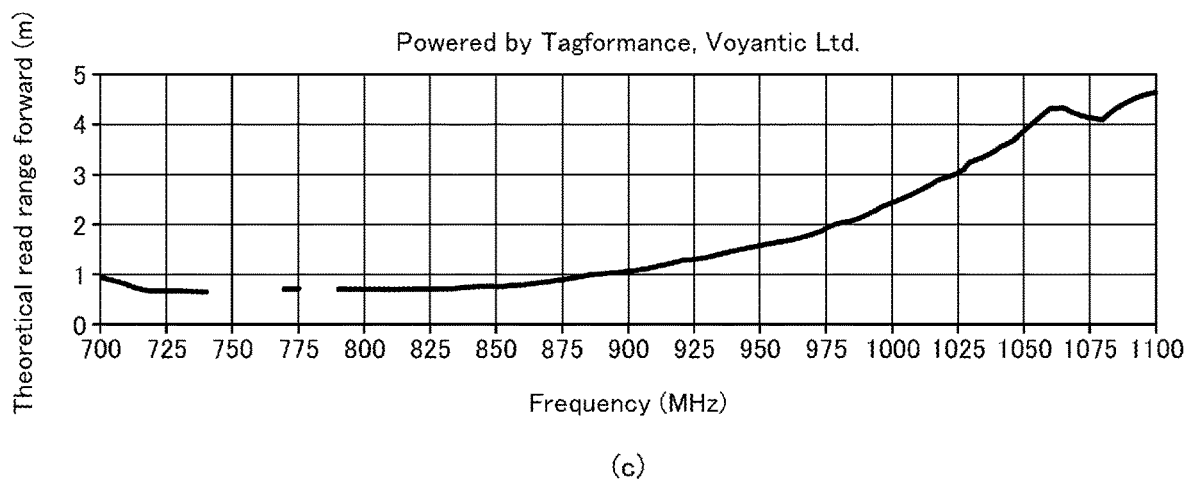
(c)

RFID TAG

TECHNICAL FIELD

The present disclosure relates to a radio frequency identification (RFID) tag.

BACKGROUND ART

RFID tags, which are attached to attachment objects, are widely used for logistics management and product management. An RFID tag includes an IC chip and an antenna electrically connected to the IC chip. The RFID tag may also be referred to as a wireless tag, an IC tag, an RF-ID tag, or an RF tag.

If an attachment object to which such a RFID tag is attached is made of metal, the RFID tag may be unable to perform communication using an antenna. Therefore, it may be difficult to successfully read identification information. This is considered to be because, if metal is present near the RFID tag, electromagnetic waves sent from a reader/writer, which transmits/receives data, to the RFID tag may be dissipated as eddy currents in the metal, and energy for sending data from an IC chip to an antenna thus cannot be efficiently obtained.

In order to solve the above-described problem, it is known that the use of a magnetic sheet is effective. Sandwiching the magnetic sheet between a RFID tag and metal to which the RFID tag is attached allows electromagnetic waves received by an antenna to circulate through the magnetic sheet and energy to be efficiently supplied to an IC chip (see Non-Patent Document 1, for example).

RELATED-ART DOCUMENTS

Non-Patent Documents

Non-Patent Document 1: "Development of Magnetic Sheet for UHF Band RFID On-Metal Tag", Mikiko Fukase and Satoshi Takemoto, DENKI-SEIKO, Vol. 82, No. 1 (2011), p. 23-30.

SUMMARY OF THE INVENTION

Problem to be Solved by the Invention

The ultra high frequency (UHF) band (radio wave type) enables long distance communication and also allows multiple tags to be read at one time, as compared to the high frequency (HE) band (13.56 MHz, electromagnetic induction type). Therefore, the UHF band has been increasingly used as a frequency band for RFID tag communication. However, with a conventional configuration in which a magnetic sheet is sandwiched between an RFID tag and metal, if the thickness of the magnetic sheet is small, communication may fail in the UHF band.

It is an object of the present disclosure to provide an RFID tag with improved communication performance.

Means to Solve the Problem

In order to solve the above-described problem, according to an aspect of the present invention, a radio frequency identification (RFID) tag for attachment to an attachment object is provided. An RFID tag includes an inlay; a magnetic sheet laminated on an attachment object side of the inlay; and a spacer layer disposed between the magnetic sheet and the attachment object. The inlay includes an IC chip configured to store identification information, a loop conductor connected to the IC chip, and an antenna unit connected to the loop conductor.

Effects of the Invention

According to the present disclosure, an RFID tag with improved communication performance can be provided.

BRIEF DESCRIPTION OF THE DRAWINGS

FIG. 12 is a diagram illustrating the frequency characteristics of RFID tags according to Comparative Examples 1 to 3;

FIG. 13 is a diagram illustrating the frequency characteristics of RFID tags according to Examples 1 to 3;

FIG. 14 is a diagram illustrating the frequency characteristics of RFID tags according to Examples 4 to 6; and FIG. 15 is a diagram illustrating the frequency characteristics of RFID tags according to Examples 7 to 9.

MODE FOR CARRYING OUT THE INVENTION

Figure 1:
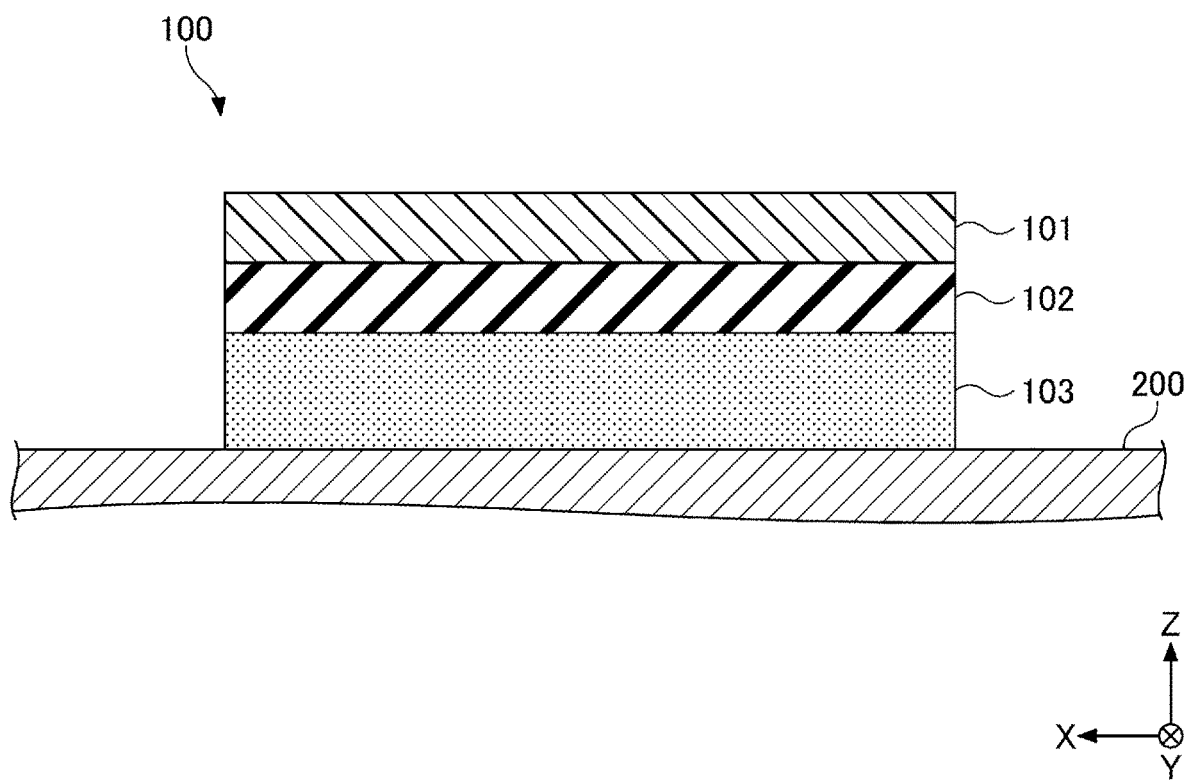
FIG. 1 is a cross-sectional view of an RFID tag according to an embodiment.

In the following, embodiments of the present invention will be described with reference to the accompanying drawings. In order to facilitate understanding of the description, the same elements are denoted by the same reference numerals in the drawings as much as possible, and the description thereof will not be repeated.

In the following description, the X-direction, the Y-direction, and the Z-direction are perpendicular to each other. The X-direction is an extending direction of a first element 1 and a second element 2 of an antenna unit 30, which will be described later. The Y-direction is an array direction of the first element 1 and the second element 2 of the antenna unit 30, which will be described later. The Z-direction is a lamination direction of an inlay 101 and a magnetic sheet 102 of an RFID tag 100. Further, for convenience of the description, the positive Z-side may be referred to as an upper side and the negative Z-side may be referred to as a lower side.

FIG. 1 is a cross-sectional view of the RFID tag 100 according to an embodiment. The RFID tag 100 is a device that has an approximately plane shape and is configured to be attached to an attachment object 200. As illustrated in FIG. 1, the RFID tag includes an inlay 101, a magnetic sheet 102, and a spacer layer 103. The attachment object 200 is, for example, metal. Examples of the metal include metals such as iron, aluminum, and copper, and in addition include alloys such as an iron alloy, an aluminum alloy, and a copper alloy.

The inlay 101 is a portion that includes elements related to functions of the RFID tag 100. The inlay 101 includes an IC chip 10 that stores identification information, a loop conductor 20 connected to the IC chip 10, and the antenna unit 30 connected to the loop conductor 20 (see FIG. 2). In the inlay 101, the antenna unit 30 is formed by bonding an aluminum sheet to a polyethylene terephthalate (PET) sheet by dry lamination, and the IC chip 10 is mounted at a predetermined position.

The magnetic sheet 102 is a sheet that includes a magnetic material. The magnetic sheet 102 is laminated on the attachment object 200 side of the inlay 101. The magnetic sheet 102 is formed by mixing magnetic powder such as a stainless steel alloy into a rubber material, a resin, or the like such that the magnetic powder is uniformly dispersed and oriented.

The spacer layer 103 is an element that causes the inlay 101 and the magnetic sheet 102 to be spaced apart from the attachment object 200 equal to the thickness of the spacer layer 103. The spacer layer 103 is laminated on the attachment object 200 side of the magnetic sheet 102, and is disposed between the magnetic sheet 102 and the attachment object 200. The spacer layer 103 is preferably formed of an insulator, such as cardboard, a woven fabric or a nonwoven fabric composed of fibers such as synthetic resins, or a sheet of inorganic material such as ceramic or glass. Further, the spacer layer 103 is preferably formed of a material that is freely deformable together with the inlay 101 and the magnetic sheet 102 in response to an external force. Accordingly, even if the attachment surface of the attachment object 200 is curved, the RFID tag 100 can be readily attached to the attachment surface of the attachment object 200, and thus, the versatility of the RFID tag 100 can be improved. The spacer layer 103 is preferably formed of cardboard. The thickness of the spacer layer 103 is preferably approximately 300 μm to 2 mm. If the thickness of the spacer layer 103 is less than 300 μm, the communicable distance of the RFID tag 100 would become too small and the communication performance of the RFID tag 100 would decrease. If the thickness of the spacer layer 103 is greater than 2 mm, the RFID tag 100 would protrude too far from the attachment object 200 and the usability of the RFID tag 100 would decrease.

The spacer layer 103 may have any configuration as long as the inlay 101 and the magnetic sheet 102 can be spaced apart from the attachment object 200 by a predetermined distance. Further, the spacer layer 103 may have any configuration, and does not necessarily have a sheet shape as illustrated in FIG. 1. For example, a plurality of leg portions may be disposed to extend from the magnetic sheet 102 to the attachment object 200, such that an air layer may be provided between the magnetic sheet 102 and the attachment object 200.

As described, the RFID tag 100 according to the embodiment includes the inlay 101, the magnetic sheet 102 laminated on the attachment object 200 side of the inlay 101, and the spacer layer 103 disposed between the magnetic sheet 102 and the attachment object 200. The inlay 101 includes the IC chip 10 that stores identification information, the loop conductor 20 connected to the IC chip 10, and the antenna unit 30 connected to the loop conductor 20.

With the above-described configuration, because the magnetic sheet 102 and the spacer layer 103 are interposed between the inlay 101, having a communication function, and the attachment object 200, the magnetic sheet 102 can cause electromagnetic waves received by the antenna to circulate through the magnetic sheet 102, thereby allowing energy to be efficiently supplied to the IC chip 10 of the inlay 101. In addition, the spacer layer 103 can cause the inlay 101 to be spaced apart from the attachment object 200, thereby reducing the influence of the attachment object 200 on the communication of the RFID tag 100. Accordingly, the communication performance of the RFID tag 100 can be improved.

Further, in a conventional RFID tag, if an attachment object 200 is made of metal, there would be a possibility that the conventional RFID tag would be unable to perform communication using an antenna, and identification information would not be successfully read. Conversely, in the RFID tag 100 according to the present embodiment, providing the spacer layer 103 as described above can reduce the influence of the attachment object 200 on the communication of the RFID tag 100. Therefore, the RFID tag 100 can perform communication regardless of the material of the attachment object 200. In particular, an effect of improving the communication performance of the RFID tag 100 becomes remarkable when the attachment object 200 is made of metal.

Figure 2:
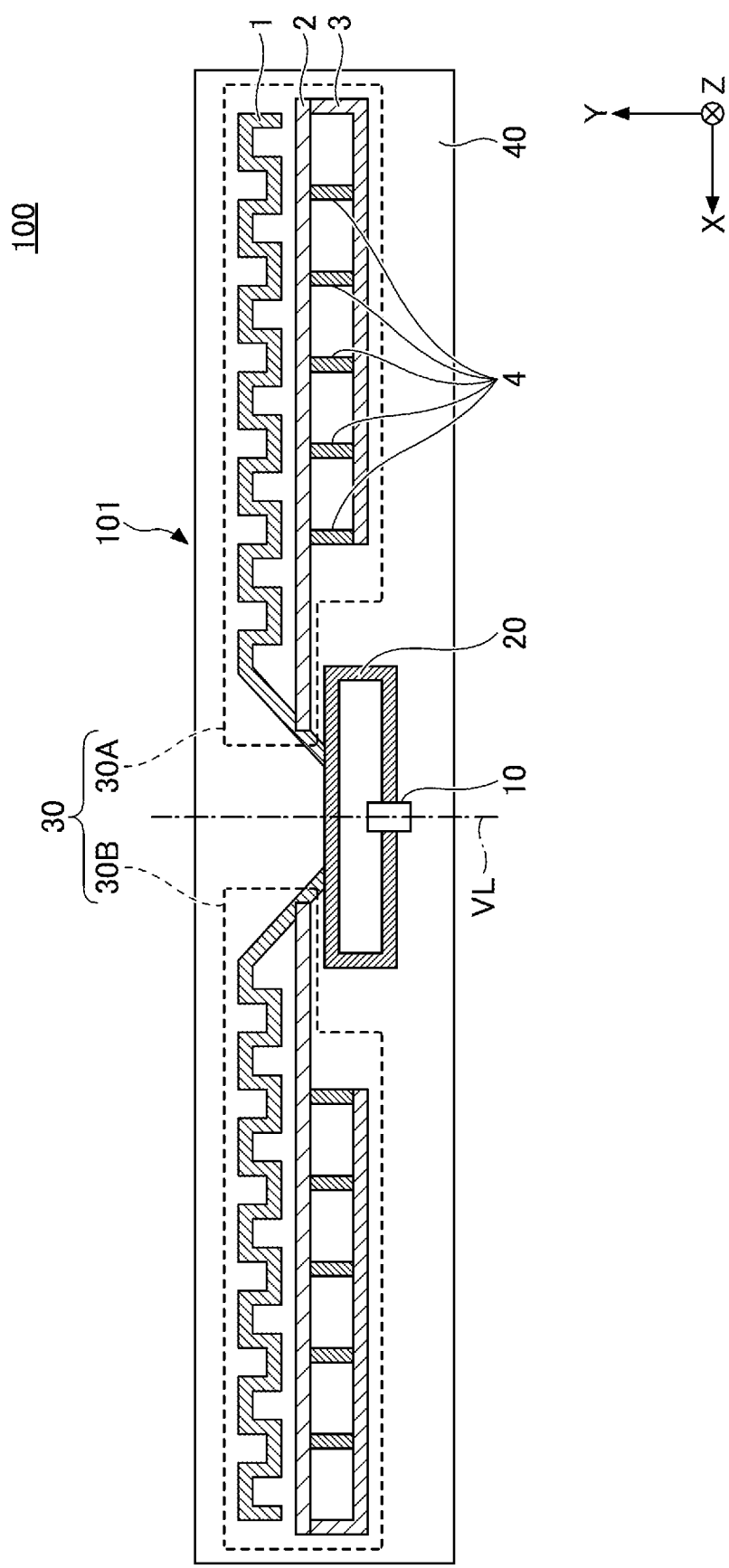
FIG. 2 is a plan view of the RFID tag of FIG. 1.

FIG. 2 is a plan view of the RFID tag 100 of FIG. 1, and is a drawing illustrating example patterns of the antenna unit 30 when viewed from above the inlay 101. The inlay 101 of the RFID tag 100 includes a sheet 40 having a strip shape, the IC chip 10, the loop conductor 20, and the antenna unit 30.

The sheet 40 is, for example, a film formed in a strip shape by laminating a plurality of synthetic resin films, such as polyethylene terephthalate films or polypropylene films. For example, the IC chip 10, the loop conductor 20, and the antenna unit 30 may be sandwiched between the plurality of laminated synthetic resin films.

The IC chip 10 has an internal capacitance, and a matching circuit is composed of the inductance of the antenna unit 30 and the internal capacitance of the IC chip 10.

The loop conductor 20 is a loop (annular) conductive wiring pattern of one turn or less in plan view when the sheet 40 is viewed in the Z-axis direction.

The loop conductor 20 is electrically connected to the IC chip 10 and the antenna unit 30. Identification information stored in the IC chip 10 is read by a reader as follows. When the antenna unit 30 receives radio waves in the ultra high frequency (UHF) band such as radio waves at a frequency of about 920 MHz, a current flows through the loop conductor 20 due to resonant action, thereby generating an electromotive force that operates the IC chip 10. When the IC chip 10 operates, the identification information stored in the IC chip 10 is encoded by the IC chip 10, and the encoded data is wirelessly transmitted to a communication device such as a reader using a radio wave of about 920 MHz as a carrier wave. The reader receives this signal, decodes the signal, and transfers the decoded signal to an external device. The RFID tag 100 according to the present embodiment is a passive wireless tag of a radio wave type that does not have a power source (battery) for retaining and transmitting identification information. Accordingly, as compared to an active wireless tag with a battery, the RFID tag 100 without a battery can be reduced in size and cost.

The antenna unit 30 is a dipole antenna configured to show resonant characteristics between the antenna unit 30 and the IC chip 10 at frequencies of radio waves for wireless communication (e.g., frequencies in the UHF band). The antenna unit 30 as a whole has an electrical length of approximately λ/2 (λ is the communication wavelength).

The antenna unit 30 has a structure that achieves conjugate impedance matching with the IC chip 10, for example, for radio waves at frequencies of approximately 920 MHz (e.g., 860 MHz to 960 MHz, more preferably 915 MHz to 935 MHz). The antenna unit 30 includes two conductor units (conductor units 30A and 30B) as a structure that achieves conjugate impedance matching with the IC chip 10. The conductor unit 30A and the conductor unit 30B are conductive wiring patterns connected to the loop conductor 20 and extending away from each other from the loop conductor 20. The conductive wiring patterns can be formed by any existing method, such as pressing or etching of copper foil or aluminum foil, plating, or screen printing of metal paste, or can be formed of a metal wire. Herein, the conductive wiring patterns are formed by etching aluminum.

The conductor unit 30A and the conductor unit 30B are line symmetrical with respect to a virtual line VL passing through substantially the center of the IC chip 10. The virtual line VL is a line parallel to the XY plane and extending in the Y-axis direction. The virtual line VL is also a line that substantially bisects the RFID tag 100 in the X-axis direction.

Each of the conductor unit 30A and the conductor unit 30B has an electrical length of approximately λ/4 (λ is the communication wavelength). The impedance matching condition of the antenna unit 30 is satisfied if the impedance of the signal source as seen from the load is the complex conjugate of the impedance of the load as seen from the signal source. Therefore, if the signal source impedance Zs=Rs+jXs, maximum power transfer is obtained when the load impedance Zl=Rs−jXs.

The conductor units 30A and 30B are line symmetrical with respect to the virtual line VL. Therefore, in the following, the configuration of the conductor unit 30A will be described. The conductor unit 30B extends in a direction opposite to a direction (negative X-axis direction) in which the conductor unit 30A extends. The other aspects of the conductor unit 30B are the same as those of the conductor unit 30A, and thus, the description of the conductor unit 30B is not repeated.

The conductor unit 30A includes a first element 1, a second element 2, a third element 3, and fourth elements 4.

The first element 1 is a conductive wiring pattern having a meandering shape and extends from the loop conductor 20 in the negative x-axis direction. The first element 1 is a meandering element.

The end portion on the positive X-axis side of the first element 1 is connected to the loop conductor 20. For example, the first element 1 is connected to a peripheral portion (connecting point) on the positive Y-axis side of the loop conductor 20. The first element 1 extends from the connecting point between the first element 1 and the loop conductor 20 to a predetermined point in the negative X-axis direction at a predetermined angle (for example, 30 degrees to 60 degrees), and extends further from the predetermined point in the negative X-axis direction. Note that the shape of the first element 1 is not limited to the shape illustrated in FIG. 2. For example, the first element 1 may be shaped to extend from the connecting point between the first element 1 and the loop conductor 20 to a predetermined point in the positive Y-axis direction, to be bent vertically from the predetermined point, and to extend in the negative X-axis direction.

Because the first element 1 is connected to the peripheral portion on the positive Y-axis side of the loop conductor 20, the length in the X-axis direction of the antenna unit 30 can be reduced. Therefore, the RFID tag 100 having a small ratio of the vertical length to the horizontal length can be provided. Accordingly, even when the RFID tag 100 is attached to a small plastic bottle having a relatively small height in the X-axis direction and thus having a small label, the RFID tag 100 can be positioned so as not to visually obstruct product information displayed on the label.

The connecting point between the first element 1 and the loop conductor 20 is not limited to the above, and the first element 1 may be connected to a peripheral portion on the negative X-axis side of the loop conductor 20. With this configuration, the first element 1 can be provided in an area on the negative X-axis side of the loop conductor 20. Therefore, the length in the Y-axis direction of the antenna unit 30 can be reduced, thereby allowing the RFID tag 100 to have an elongated shape. Accordingly, even when the RFID tag 100 is attached to a large plastic bottle having a relatively large height in the X-axis direction, the RFID tag 100 can be positioned so as not to visually obstruct product information displayed on the label.

The second element 2 is a conductive wiring pattern having a linear shape and extending from the loop conductor 20 in the negative X-axis direction. The second element 2 is a linear element.

The end portion on the positive X-axis side of the second element 2 is connected to the first element 1 or is connected to the loop conductor 20.

If the second element 2 is connected to the first element 1, the second element 2 is connected to, for example, the vicinity of the connecting point between the first element 1 and the loop conductor 20. The second element 2 extends a certain distance from the connecting point between the second element 2 and the first element 1 in the negative X-axis direction.

If the second element 2 is connected to the loop conductor 20, the second element 2 is connected to, for example, a peripheral portion on the positive Y-axis of the loop conductor 20.

The second element 2 may be provided on the negative Y-axis side of the first element 1, or may be provided on the positive Y-axis side of the first element 1.

As illustrated in FIG. 2, if the second element 2 is provided on the negative Y-axis side of the first element 1, an area on the negative X-axis side of the loop conductor 20 can be effectively utilized. Therefore, the RFID tag 100 having a small ratio of the vertical length to the horizontal length can be provided.

A gap (separation distance in the Y-axis direction) between the second element 2 and the first element 1 is preferably set to a value from 0.5 mm to 2.0 mm, such that the impedance of the antenna becomes the complex conjugate of the impedance of the IC chip. If the separation distance is excessively large, the real part of the impedance increases, thus making it difficult for the antenna to be the complex conjugate of the IC chip. The second element 2 serves as a primary element, and the first element 1 serves as a secondary element.

The third element 3 is a conductive wiring pattern having a hook shape and extending from the tip on the negative X-axis side of the second element 2 in a direction different from the extending direction of the second element 2. The third element 3 is a hook element. The third element 3 may have a U-shaped pattern or an L-shaped pattern.

Note that the second element 2 and the third element 3 may be integrally formed in a hook shape.

As illustrated in FIG. 2, the third element 3 extends a certain distance from the tip on the negative X-axis side of the second element 2 in the negative Y-axis direction, is bent perpendicularly in the positive X-axis direction, and extends a certain distance toward the loop conductor 20. This shape allows the area on the negative X-axis side of the loop conductor 20 to be effectively utilized. Therefore, the RFID tag 100 having a small ratio of the vertical length to the horizontal length can be provided.

A gap is formed between a part, extending the certain distance toward the loop conductor 20, of the third element 3 and the second element 2. The gap (separation distance in the Y-axis direction) is preferably set to a value from 1.0 mm to 30.0 mm. The plurality of fourth elements 4 are provided in the gap.

The fourth elements 4 are conductive wiring patterns extending from the second element 2 to the third element 3. The fourth elements 4, the second element 2, and the third element 3 together form a grid pattern. The fourth elements 4 are grid elements.

In the present embodiment, the five fourth elements 4 are used as an example. However, the present invention is not limited thereto, and one or more fourth elements 4 may be used. The distance between two adjacent fourth elements 4 in the X-axis direction is preferably set to a value from 1.0 mm to 30.0 mm so as to broaden the communication frequency range and also increase the communication distance.

The electrical length of each element is set as follows.

For example, the first element 1 is set to have an electrical length that is a multiple of $\lambda/4$, where $\lambda$ is the wavelength of a frequency used. In this case, at least one of the electrical length of the second element 2 and the electrical length of the third element 3 is set to be different from the electrical length that is a multiple of $\lambda/4$. In this case, the different electrical length ranges from, for example, $\lambda/3.5$ to $\lambda/4.5$, where $\lambda$ is the wavelength of the frequency used.

Instead of the first element 1, the second element 2 may be set to have an electrical length that is a multiple of $\lambda/4$, where $\lambda$ is the wavelength of the frequency used. In this case, at least one of the electrical length of the first element 1 and the electrical length of the third element 3 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

Further, instead of the first element 1, the sum of the electrical length of the second element 2 and the electrical length of the third element 3 having an L-shape (an inverse L-shape) may be set to a multiple of $\lambda/4$, where $\lambda$ is the wavelength of the frequency used. In this case, the electrical length of the first element 1 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

Further, instead of the first element 1, the sum of the electrical length of the second element 2, the electrical length of the third element 3, and the electrical length of a fourth element 4 (any one of three fourth elements 4, for example) may be set to a multiple of $\lambda/4$, where $\lambda$ is the wavelength of the frequency used. In this case, the electrical length of the first element 1 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

According to the RFID tag 100 of the present embodiment, the strength of a radio wave received by the antenna unit 30 can be increased by combining a plurality of antenna elements having different shapes or by combining a plurality of elements having different electrical lengths.

Further, the RFID tag 100 according to the present embodiment may have configurations as described below. In the following, elements identical to those of the RFID tag 100 according to the above-described embodiment are denoted by the same reference numerals, and the description thereof will not be repeated. Elements different from those of the RFID tag 100 will be described.

Figure 3:
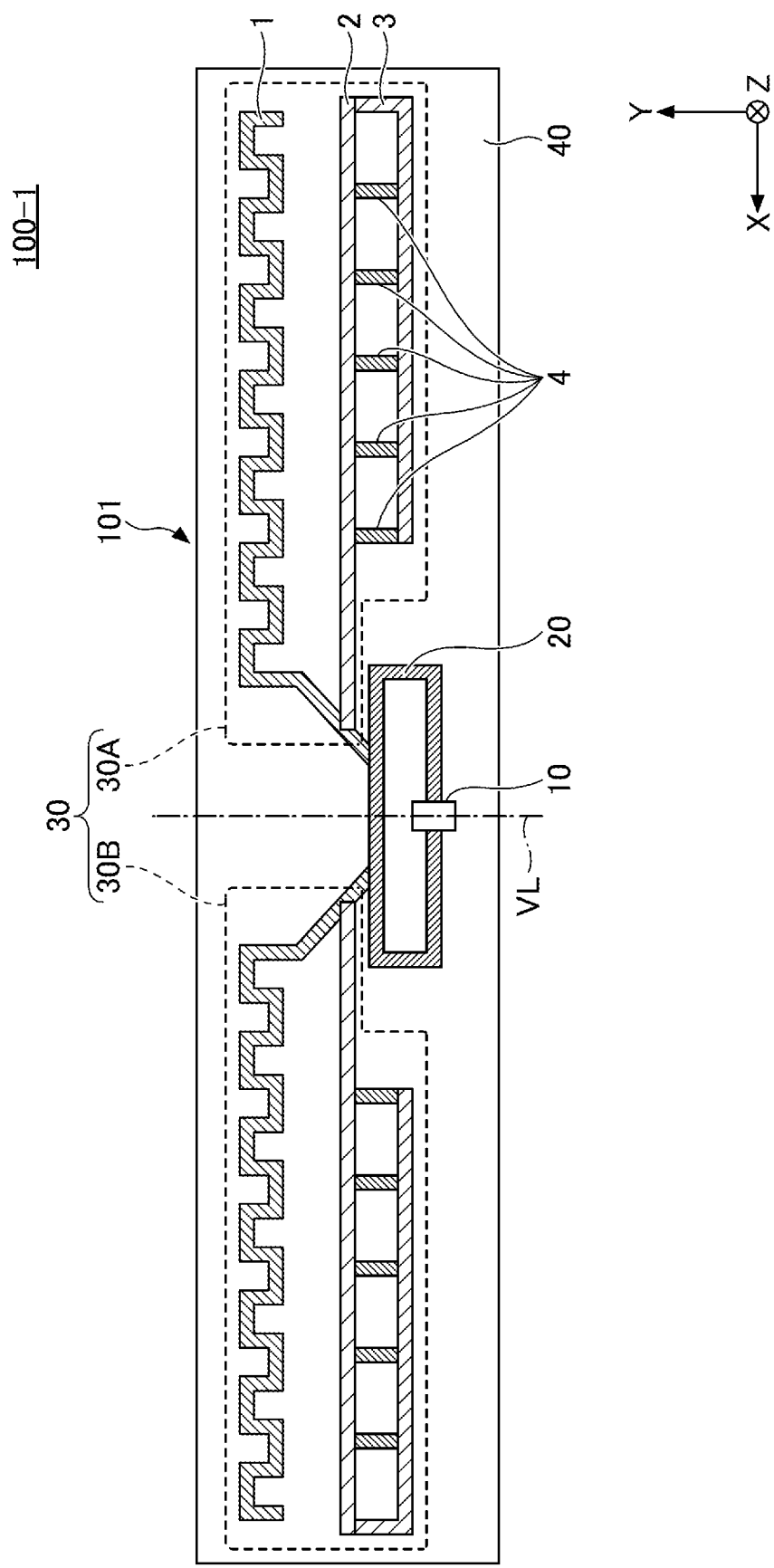
FIG. 3 is an example configuration of an RFID tag according to a first modification.

FIG. 3 is an example configuration of an RFID tag 100-1 according to a first modification. In the RFID tag 100-1, the distance between the first element 1 and the second element 2 in the Y-axis direction is increased. In the RFID tag 100-1, the distance between the first element 1 and the second element 2 is preferably set to a value from 2.0 mm to 5.0 mm, such that the impedance of the antenna becomes the complex conjugate of the impedance of the IC chip. If the distance between the first element 1 and the second element 2 exceeds 5.0 mm, the resistance of the antenna would increase and the communication distance would be reduced.

According to the RFID tag 100-1, effects similar to those of the RFID tag 100 can be obtained. Further, according to the RFID tag 100-1, for example, even if the vertical width of the first element 1 having a meandering shape is not uniform due to manufacturing tolerances, the increased distance between the first element 1 and the second element 2 can prevent contact between the first element 1 and the second element 2. Accordingly, the control of manufacturing tolerances of the first element 1 and the like is not required. Further, the increased distance between the first element 1 and the second element 2 allows each wiring pattern to be readily manufactured. As a result, the manufacturing yield of the RFID tag 100-1 can be improved, and the manufacturing cost can be reduced.

Figure 4:
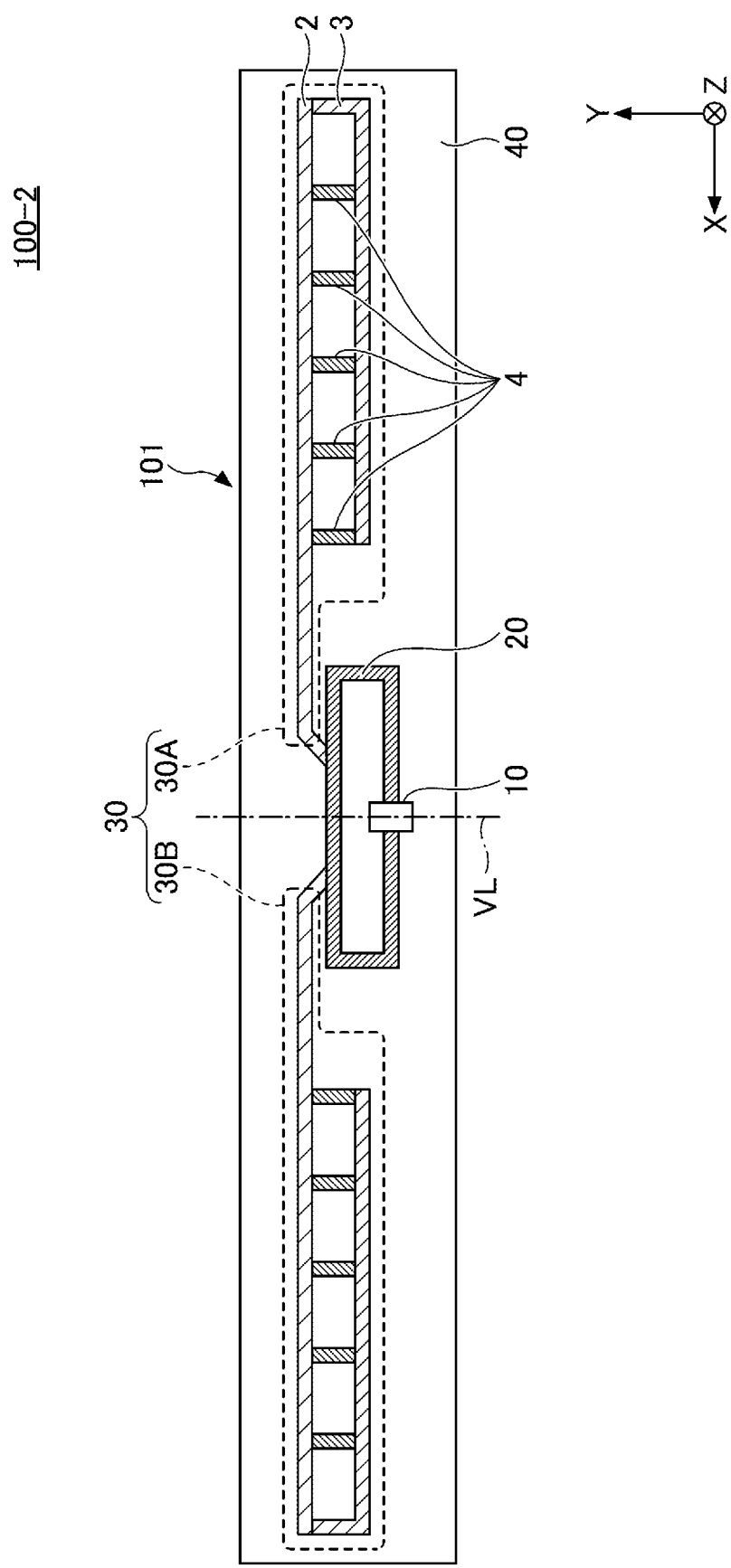
FIG. 4 is an example configuration of an RFID tag according to a second modification.

FIG. 4 is an example configuration of an RFID tag 100-2 according to a second modification. As compared to the RFID tag 100, the RFID tag 100-2 does not include the first element 1. The electrical length of each element is set as follows.

For example, the second element 2 is set to have an electrical length that is a multiple of $\lambda/4$, where $\lambda$ is the wavelength of the frequency used. In this case, the electrical length of the third element 3 is set to be different from the electrical length that is a multiple of $\lambda/4$. The different electrical length ranges from, for example, $\lambda/3.5$ to $\lambda/4.5$, where $\lambda$ is the wavelength of the frequency used.

Instead of the second element 2, the third element 3 may be set to have an electrical length that is a multiple of $\lambda/4$, where $\lambda$ is the wavelength of the frequency used. In this case, the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

Further, instead of the second element 2, the sum of the electrical length of the third element 3 and the electrical length of a fourth element 4 (one of three fourth elements 4, for example) may be set to a multiple of $\lambda/4$, where $\lambda$ is the wavelength of the frequency used. In this case, the electrical length of the second element 2 is set to be different from the electrical length that is a multiple of $\lambda/4$, where $\lambda$ is the wavelength of the frequency used. In this case, the different electrical length ranges from, for example, $\lambda/3.5$ to $\lambda/4.5$, where $\lambda$ is the wavelength of the frequency used.

According to the RFID tag 100-2, effects similar to those of the RFID tag 100 can be obtained by combining a plurality of elements having both different electrical lengths and different shapes.

Further, because the RFID tag 100-2 does not include the first element 1, the control of manufacturing tolerances of the first element 1 and the like is not required, and also the structure of the RFID tag 100-2 can be simplified. As a result, the manufacturing yield of the RFID tag 100-2 can be improved, and the manufacturing cost can be further reduced.

Figure 5:
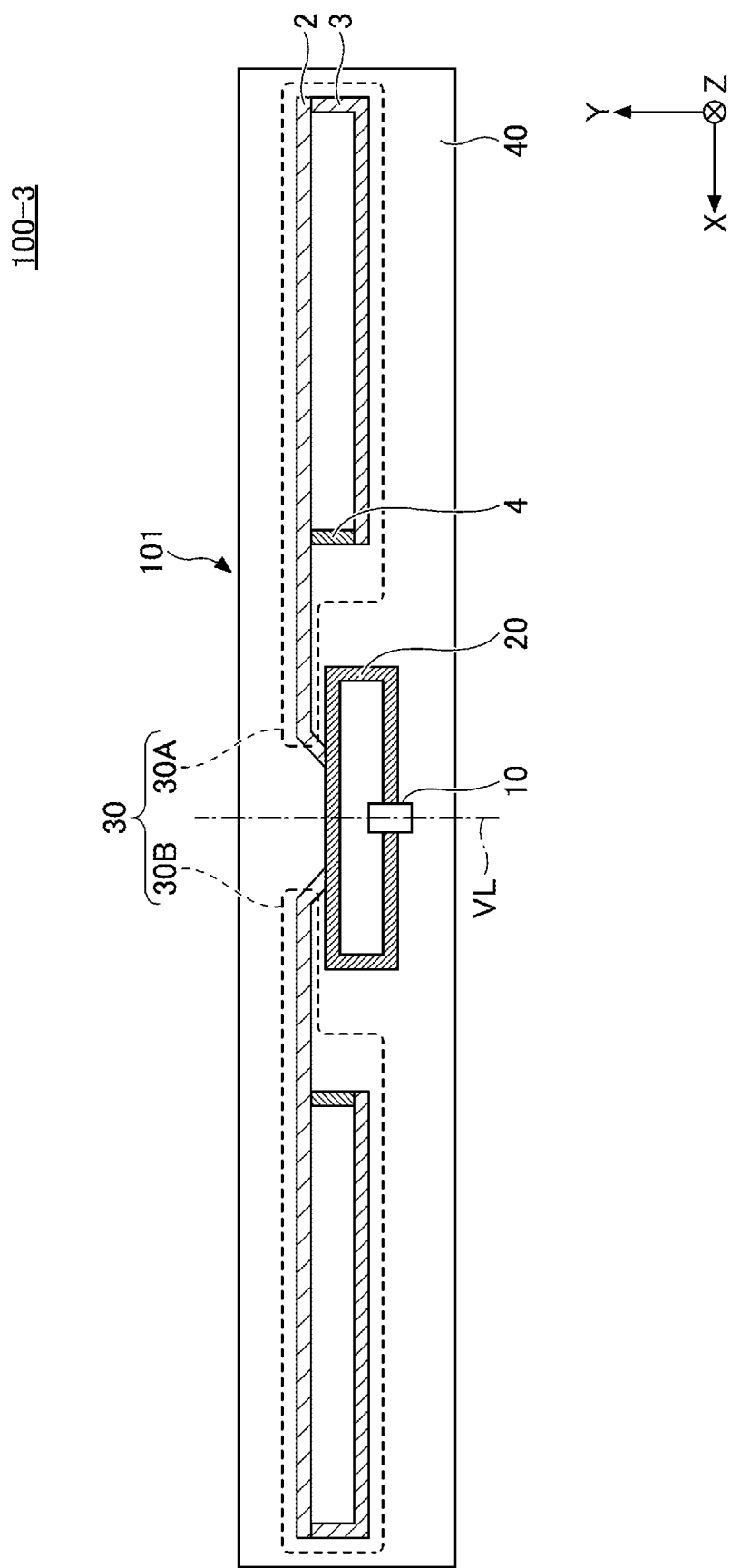
FIG. 5 is an example configuration of an RFID tag according to a third modification.

FIG. 5 is an example configuration of an RFID tag 100-3 according to a third modification. As compared to the RFID tag 100-2, the RFID tag 100-3 includes a fewer number of fourth elements 4.

According to the RFID tag 100-3, effects similar to those of the RFID tag 100 can be obtained by combining a plurality of elements having both different electrical lengths and different shapes.

Further, because the RFID tag 100-3 includes the fewer number of fourth elements 4, the control of manufacturing tolerances of the fourth elements 4 and the like is not required, and also the structure of the RFID tag 100-3 can be simplified. As a result, the manufacturing yield of the RFID tag 100-3 can be improved, and the manufacturing cost can be further reduced.

Figure 6:
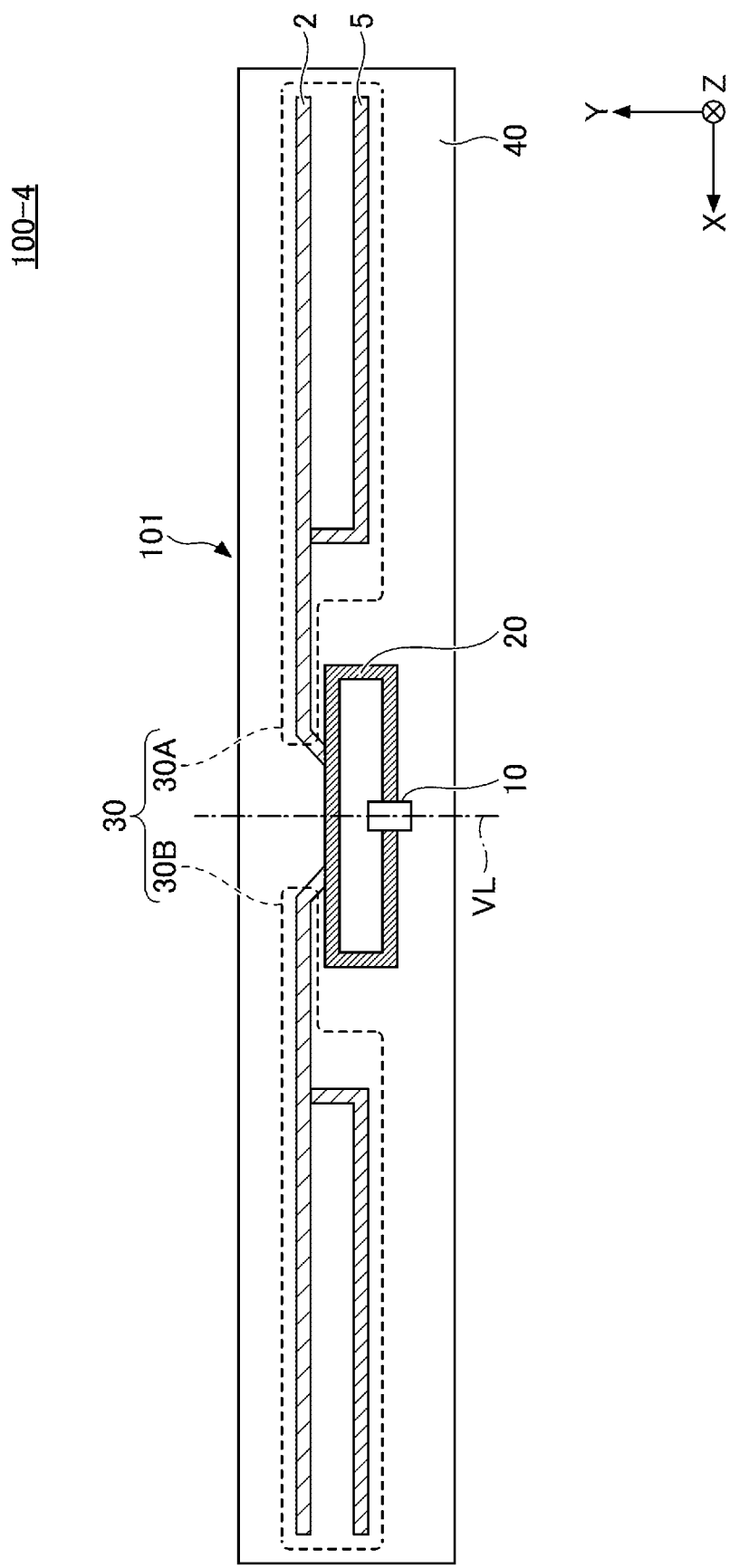
FIG. 6 is an example configuration of an RFID tag according to a fourth modification.

FIG. 6 is an example configuration of an RFID tag 100-4 according to a fourth modification. As compared to the RFID tag 100-3, the RFID tag 100-4 includes a fifth element 5, and does not include the third element 3 and the fourth elements 4. The second element 2 is a primary element, and the fifth element 5 is a secondary element.

The fifth element 5 is a conductor that is connected to the second element 2, which is a linear element, so as to branch from an intermediate portion of the second element 2, and that extends in parallel to the second element 2. The fifth element 5 is a branch element.

A connecting point between the fifth element 5 and the second element 2 is located a predetermined distance away from a connecting point between the second element 2 and the loop conductor 20. The predetermined distance is preferably set to a value from 5.0 mm to 100.0 mm, such that the resistance of the antenna does not excessively increase.

A gap is formed between the second element 2 and a part, extending in a direction opposite to the loop conductor 20, of the fifth element 5. The gap (separation distance in the Y-axis direction) is preferably set to a value from 1.0 mm to 30.0 mm, such that the resistance of the antenna does not excessively increase. Note that the fourth elements 4 as described above may be provided in the gap.

The electrical length of each element is set as follows.

For example, the second element 2 is set to have an electrical length that is a multiple of $\lambda/4$, where $\lambda$ is the wavelength of the frequency used. In this case, the electrical length of the fifth element 5 is set to be different from the electrical length that is a multiple of $\lambda/4$. The different electrical length ranges from, for example, $\lambda/3.5$ to $\lambda/4.5$, where $\lambda$ is the wavelength of the frequency used.

Instead of the second element 2, the fifth element 5 may be set to have an electrical length that is a multiple of $\lambda/4$, where $\lambda$ is the wavelength of the frequency used. In this case, the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

According to the RFID tag 100-4, effects similar to those of the RFID tag 100 can be obtained by combining a plurality of elements having both different electrical lengths and different shapes.

Further, because the RFID tag 100-4 does not include the fourth elements 4, the control of manufacturing tolerances of the fourth elements 4 is not required, and also the structure of the RFID tag 100-4 can be simplified. As a result, the manufacturing yield of the RFID tag 100-4 can be improved, and the manufacturing cost can be further reduced.

Further, the RFID tag 100-4 has a structure in which the branch point of the fifth element 5, namely the point on the second element 2 from which the fifth element 5 extends, can be easily adjusted, thus providing a greater degree of freedom in design conditions of the RFID tag 100-4. For example, if the attachment object 200 is a container having a special shape in which the surface area of the RFID tag 100-4 needs to be decreased as much as possible, it would be assumed that the area below (area on the negative Y-axis side of) the second element 2 would be narrowed. Even in such a case, the fifth element 5 can be applied to the container having the special shape by positioning the branch point of the fifth element 5 as close as possible to the loop conductor 20 and decreasing the length of the part, extending in the X-axis direction, of the fifth element 5. Accordingly, because the RFID tag 100-4 can be applied to various types of containers, the production volume of the RFID tag 100-4 can be increased. Thus, the unit price of the RFID tag 100-4 can be further reduced.

Figure 7:
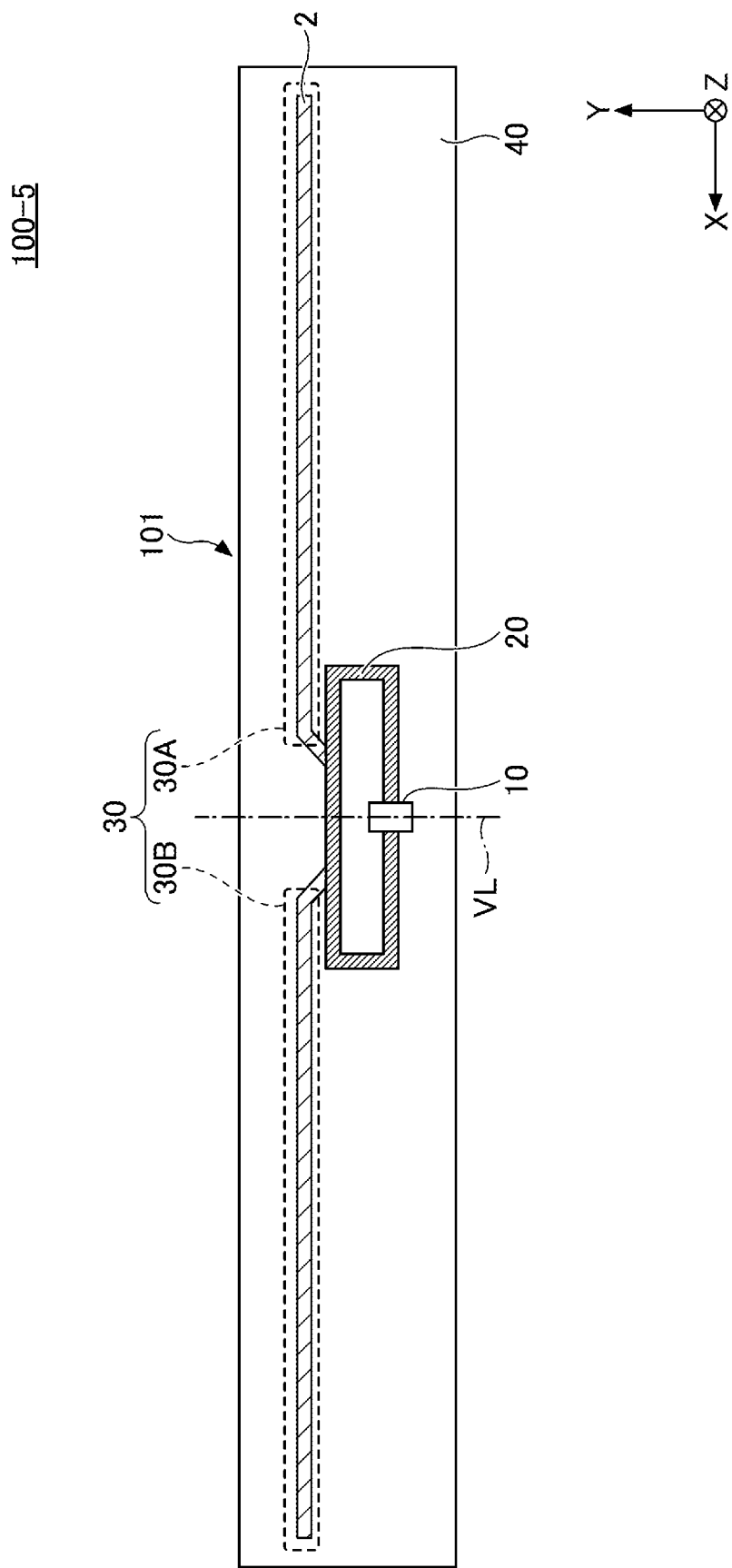
FIG. 7 is an example configuration of an RFID tag according to a fifth modification.

FIG. 7 is an example configuration of an RFID tag 100-5 according to a fifth modification. As compared to the RFID tag 100-4, the RFID tag 100-5 does not include the fifth element 5. In place of a structure that combines a plurality of elements having both different electrical lengths and shapes, the RFID tag 100-5 has a simple structure that includes the second element 2.

The second element 2 of the RFID tag 100-5 is a conductor having a linear shape and set to have an electrical length that is a multiple of approximately ¼ of the wavelength of the frequency used.

The communication distance between the RFID tag 100-5 and the reader tends to decrease as compared to the communication distances between the reader and the RFID tags 100 through 100-4. However, the inventors have confirmed that the practical communication distance (such as approximately 1 m to 7 m) between the RFID tag 100-5 and the reader can be secured. Even if the communication distance decreases, the reader can read identification information by installing the reader on a conveyor belt that carries containers and the like. In this manner, the RFID tag 100-5 can be utilized for inventory control of various products.

It is considered that the reason why the RFID tag 100-5 has superior impedance characteristics is because the antenna element is formed in a linear shape, and electrical coupling between the antenna element and a liquid is reduced as compared to an antenna element formed in a meandering shape.

Conventionally, in order to secure an electrical length required for wireless communication of an antenna unit 30, an antenna element having a meandering shape, an antenna element having a loop shape, or the like is employed in most cases. However, if such an antenna element is employed, electrical coupling between the antenna element and a liquid would increase, thus causing impedance characteristics to be largely disturbed. Therefore, desired antenna performance would not be obtained. In view of this, measures are conventionally taken, such as decreasing the distance between the antenna element and the container by disposing a spacer between the antenna element and the container so as to reduce electrical coupling, or inserting a metal sheet between the antenna element and the container so as to reduce electrical coupling.

Conversely, the RFID tag 100-5 according to the fifth modification does not require measures as described above. Accordingly, controlling the manufacturing of the RFID tag 100-5 can be simplified, and the amount of materials required to manufacture the RFID tag 100-5 can also be significantly reduced. Therefore, the manufacturing cost of the RFID tag 100-5 can be significantly reduced.

Figure 8:
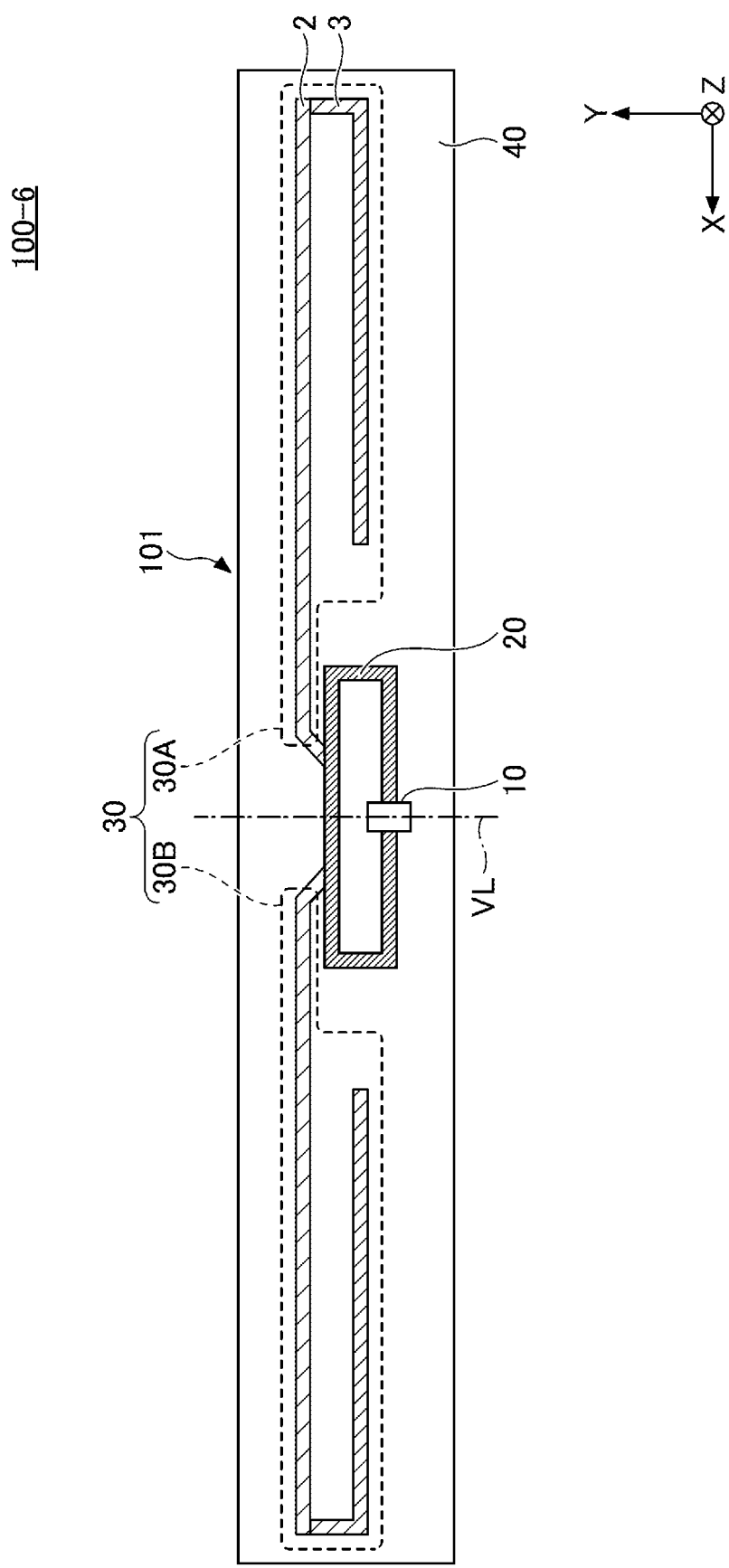
FIG. 8 is an example configuration of an RFID tag according to a sixth modification.

FIG. 8 is an example configuration of an RFID tag 100-6 according to a sixth modification. As compared to the RFID tag 100-3 according to the third modification, the RFID tag 100-6 does not include the fourth elements 4.

The inventors have confirmed that the communication distance between the RFID tag 100-6 and the reader is equivalent to the communication distance between the RFID tag 100-3 and the reader.

Further, because the RFID tag 100-6 does not include the fourth elements 4, the control of manufacturing tolerances of the fourth elements 4 is not required, and also the structure of the RFID tag 100-6 can be simplified. As a result, the manufacturing yield of the RFID tag 100-6 can be improved, and the manufacturing cost can be further reduced.

Figure 9:
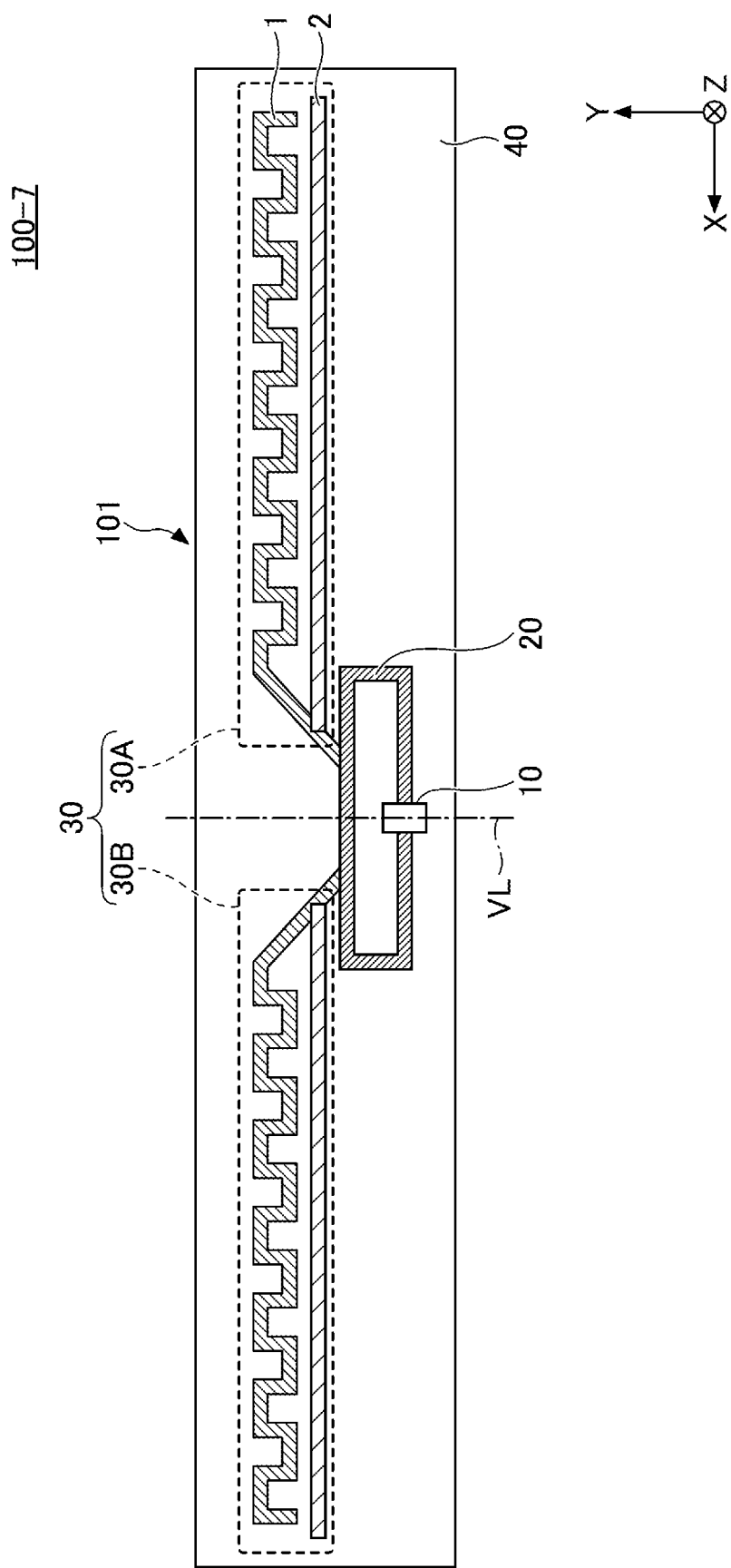
FIG. 9 is an example configuration of an RFID tag according to a seventh modification.

FIG. 9 is an example configuration of an RFID tag 100-7 according to a seventh modification. As compared to the RFID tag 100, the RFID tag 100-7 does not include the third element 3 and the fourth elements 4. If the first element 1 serves as a primary element, the second element 2 serves as a secondary element. If the second element 2 serves as a primary element, the first element 1 serves as a secondary element.

The electrical length of each element is set as follows.

For example, the first element 1 is set to have an electrical length that is a multiple of $\lambda/4$, where $\lambda$ is the wavelength of the frequency used. In this case, the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

Instead of the first element 1, the second element 2 may be set to have an electrical length that is a multiple of $\lambda/4$, where $\lambda$ is the wavelength of the frequency used. In this case, the electrical length of the first element 1 is set to be different from the electrical length that is a multiple of $\lambda/4$. The different electrical length ranges from, for example, $\lambda/3.5$ to $\lambda/4.5$, where $\lambda$ is the wavelength of the frequency used.

Because the RFID tag 100-7 does not include the third element 3 and the fourth elements 4, the control of manufacturing tolerances of the third element 3 and the fourth elements 4 is not required, and also the structure of the RFID tag 100-7 can be simplified. As a result, the manufacturing yield of the RFID tag 100-7 can be improved, and the manufacturing cost can be further reduced.

Figure 10:
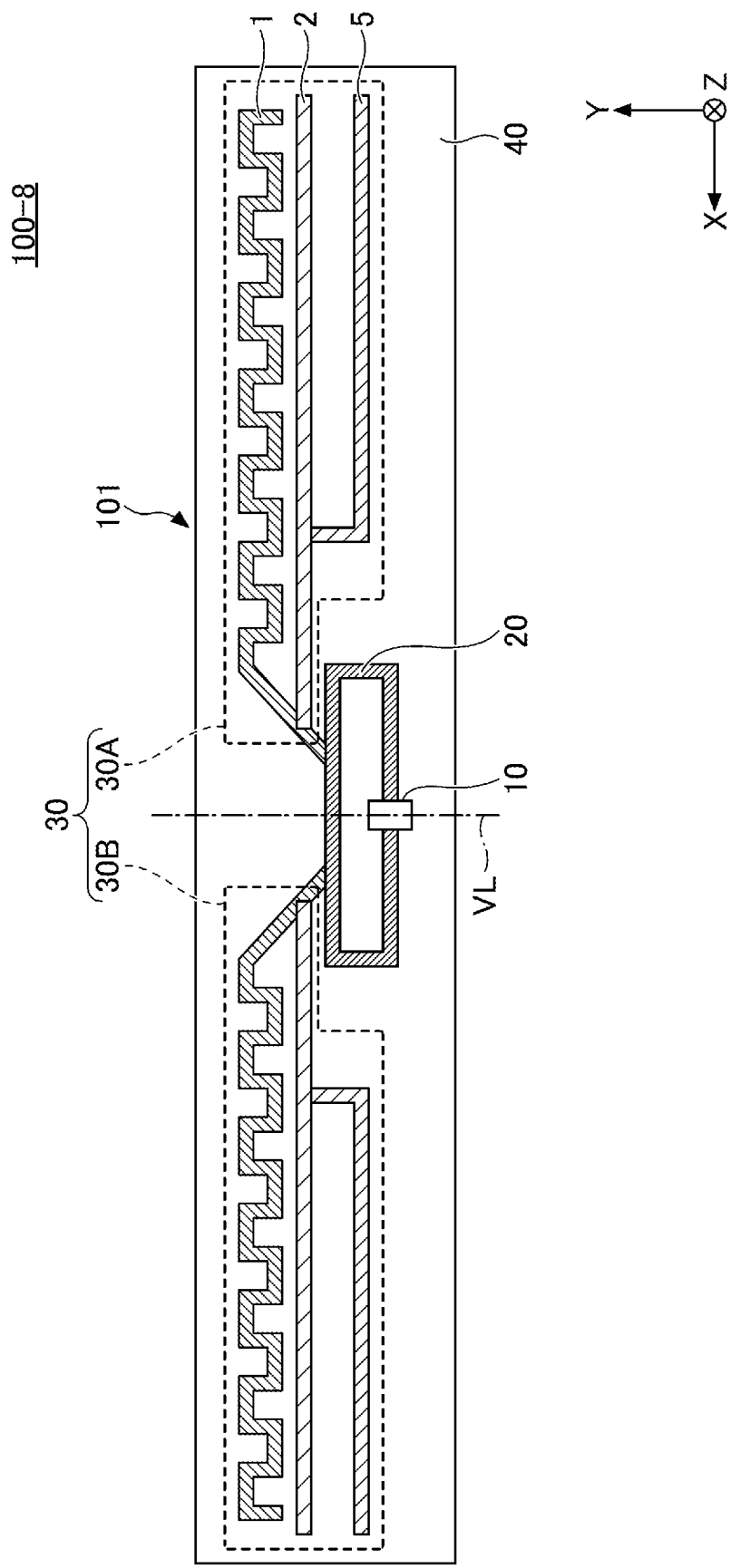
FIG. 10 is an example configuration of an RFID tag according to an eighth modification.

FIG. 10 is an example configuration of an RFID tag 100-8 according to an eighth modification. As compared to the RFID tag 100, the RFID tag 100-8 includes the fifth element 5 in place of the third element 3 and the fourth elements 4. If the first element 1 serves as a primary element, the second element 2 serves as a secondary element. If the second element 2 serves as a primary element, the first element 1 serves as a secondary element.

The electrical length of each element is set as follows.

For example, if the first element 1 is set to have an electrical length that is a multiple of $\lambda/4$, where $\lambda$ is the wavelength of the frequency used, one of the electrical length of the second element 2 and the electrical length of the fifth element 5 is set to be different from the electrical length that is a multiple of $\lambda/4$. The different electrical length ranges from, for example, $\lambda/3.5$ to $\lambda/4.5$, where $\lambda$ is the wavelength of the frequency used.

Further, if the second element 2 is set to have an electrical length that is a multiple of $\lambda/4$, where $\lambda$ is the wavelength of the frequency used, one of the electrical length of the first element 1 and the electrical length of the fifth element 5 is set to be different from the electrical length that is a multiple of $\lambda/4$. The different electrical length ranges from, for example, $\lambda/3.5$ to $\lambda/4.5$, where $\lambda$ is the wavelength of the frequency used.

Further, if the fifth element 5 is set to have an electrical length that is a multiple of $\lambda/4$, where $\lambda$ is the wavelength of the frequency used, one of the electrical length of the first element 1 and the electrical length of the second element 2 is set to be different from the electrical length that is a multiple of $\lambda/4$. The different electrical length ranges from, for example, $\lambda/3.5$ to $\lambda/4.5$, where $\lambda$ is the wavelength of the frequency used.

Because the RFID tag 100-8 does not include, for example, the fourth elements 4, the control of manufacturing tolerances of the fourth elements 4 is not required, and also the structure of the RFID tag 100-8 can be simplified. As a result, the manufacturing yield of the RFID tag 100-8 can be improved, and the manufacturing cost can be further reduced.

Figure 11:
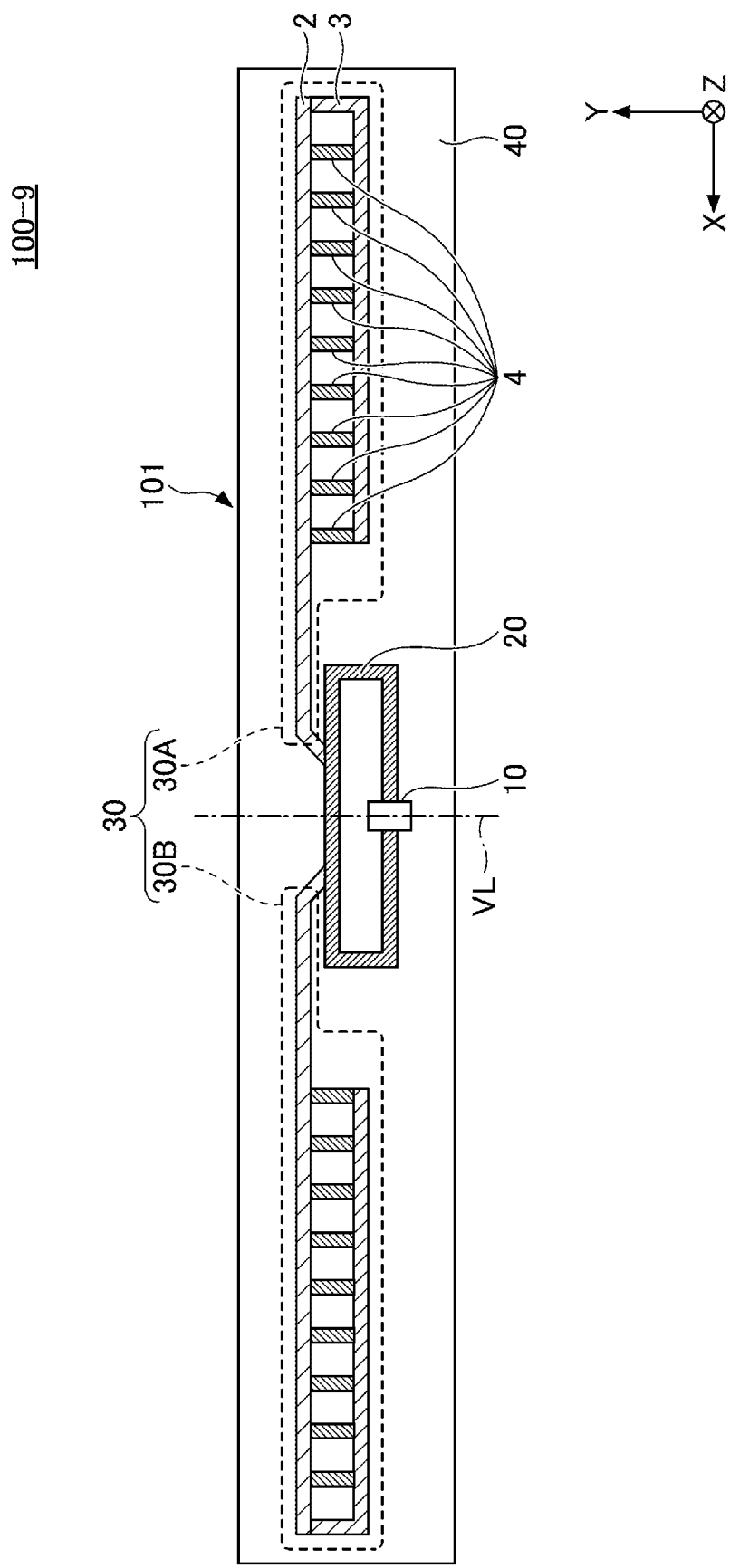
FIG. 11 is an example configuration of an RFID tag according to a ninth modification.

FIG. 11 is a diagram illustrating an example configuration of an RFID tag 100-9 according to a ninth modification. The RFID tag 100-9 differs from the RFID tag 100-2 illustrated in FIG. 4 in that the RFID tag 100-9 includes a larger number of fourth elements 4.

According to the RFID tag 100-9, the strength of a radio wave received by the antenna unit 30 can be increased by combining a plurality of antenna elements having different electrical lengths. In particular, because the RFID tag 100-9 includes the larger number of fourth elements 4, the strength of a radio wave received by the antenna unit 30 can be increased even when the RFID tag 100-9 is used in water.

Note that each of the RFID tags 100 through 100-9 according to the embodiment and modifications is applicable to not only radio waves in the UHF band, but also radio waves in the very high frequency (VHF) band, radio waves in the super high frequency (SHF) band, and the like. If the frequency used for the RFID tags 100 through 100-9 is in the UHF band of, for example, 860 to 960 MHz or 915 to 925 MHz, the antenna size can be advantageously reduced because the UHF band has a higher frequency and a shorter wavelength than the VHF band. Accordingly, each of the RFID tags 100 through 100-9 can be formed in a shape suitable for radio waves in the UHF band. Therefore, the size of the IC chip 10 can be reduced, and a wireless tag having a small memory capacity can be obtained at reduced cost.

Further, each of the RFID tags 100 through 100-9 according to the embodiment and modifications may be a wireless tag of an electromagnetic induction type or a wireless tag of a radio wave type. In particular, if each of the RFID tags 100 through 100-9 is a wireless tag of a radio wave type, a predetermined wireless communication distance from a reader can be secured. The predetermined wireless communication distance is in a range from 0 m to 20 m, for example.

Further, each of the RFID tags 100 through 100-9 according to the embodiment and modifications can use radio waves in the UHF band, the VHF band, or the SHF band for wireless communication regardless of whether each of the RFID tags 100 through 100-9 is present in the air (ambient air) or in water.

Note that the RFID tag 100 according to the embodiment may have any configuration as long as at least the inlay 101, the magnetic sheet 102, and the spacer layer 103 are laminated in this order. Further, the antenna unit 30 may include antenna patterns different from those of the above-described RFID tags 100 through 100-9.

In the following, Examples of the present invention will be described in detail with reference to Comparative Examples.

Example 1

An RFID tag 100 as illustrated in FIG. 1 was produced by laminating an inlay 101, a magnetic sheet 102 having a thickness of 80 μm, and a spacer layer 103 made of cardboard and having a thickness of 550 μm. In the inlay 101, an antenna unit 30 was formed by bonding an aluminum sheet having a thickness of 10 μm to a PET film having a thickness of 38 μm by dry lamination, and an IC chip 10 was mounted at a predetermined position. Antenna patterns of the antenna unit 30 were formed as illustrated in FIG. 2.

The RFID tag 100 produced as described above was attached to an attachment object 200, which is a stainless steel plate, and in this state, an RFID tag performance testing device (Tagformance Pro, manufactured by Voyantic Ltd.) was used to measure the frequency characteristics of the RFID tag 100. The frequency range of a radio wave for wireless communication at the time of measurement was 700 to 1200 MHz, and the equivalent isotropically radiated power (EIRP) was 3.28 W.

Example 2

An RFID tag 100 was produced in a manner similar to Example 1 except that the thickness of the magnetic sheet 102 was changed to 120 μm. Then, the frequency characteristics of the RFID tag 100 were measured.

Example 3

An RFID tag 100 was produced in a manner similar to Example 1 except that the thickness of the magnetic sheet 102 was changed to 200 μm. Then, the frequency characteristics of the RFID tag 100 were measured.

Comparative Example 1

An RFID tag 100 was produced in a manner similar to Example 1 except that no spacer layer 103 was provided. That is, the RFID tag 100 was produced by laminating an inlay 101 and a magnetic sheet 102 having a thickness of 80 μm. Then, the frequency characteristics of the produced RFID tag were measured in a manner similar to Example 1.

Comparative Example 2

An RFID tag 100 was produced in a manner similar to Example 2 except that no spacer layer 103 was provided. Then, the frequency characteristics of the RFID tag 100 were measured.

Comparative Example 3

An RFID tag 100 was produced in a manner similar to Example 3 except that no spacer layer 103 was provided. Then, the frequency characteristics of the RFID tag 100 were measured.

FIG. 12 is a diagram illustrating the frequency characteristics of the RFID tags according to Comparative Examples 1 to 3. FIG. 12 (a) indicates the frequency characteristics in Comparative Example 1, FIG. 12 (b) indicates the frequency characteristics in Comparative Example 2, and FIG. 12 (c) indicates the frequency characteristics in Comparative Example 3. In FIG. 12, the horizontal axis represents the frequency of a radio wave for wireless communication, and the vertical axis represents the communicable distance between each of the RFID tags 100 and a reader. In FIG. 12, frequency ranges in which no curves are plotted in the graphs indicate that the RFID tags 100 were unable to perform wireless communication with the reader. In Comparative Example 3 in which the magnetic sheet 102 has the largest thickness, wireless communication was unable to be performed in a frequency band of approximately 920 MHz or less. In Comparative Example 2 in which the magnetic sheet 102 has the next largest thickness and Comparative Example 1 in which the magnetic sheet 102 has the smallest thickness, wireless communication was unable to be performed in a frequency band of approximately 1020 MHz or less. As described, in Comparative Examples 1 to 3, the RFID tags 100 were unable to perform communication in the UHF band if the thickness of the magnetic sheet 102 is small.

FIG. 13 is a diagram illustrating the frequency characteristics of the RFID tags 100 according to Examples 1 to 3. FIG. 13 (a) indicates the frequency characteristics in Example 1, FIG. 13 (b) indicates the frequency characteristics in Example 2, and FIG. 13 (c) indicates the frequency characteristics in Example 3. The horizontal axis and the vertical axis in FIG. 13 are the same as those in FIG. 12. As illustrated in FIG. 13, in Examples 1 to 3, frequency bands in which communication is possible extend further to lower frequency sides than those of Comparative Examples 1 to 3, and communication can be sufficiently performed in the UHF band regardless of the thickness of the magnetic sheet 102.

As indicated by the test results in FIG. 12 and FIG. 13, according to the embodiment, frequency bands in which communication is possible can extend further to lower frequency sides by disposing the spacer layer 103 between the magnetic sheet 102 (on which the inlay 101 is laminated) of the RFID tag 100 and the attachment object 200, which is a stainless steel plate. Further, the RFID tag 100 according to the embodiment can sufficiently perform communication in the UHF band even if the attachment object 200 is made of metal. That is, the communication performance of the RFID tag 100 can be improved.

Further, with reference to Examples 4 to 9, effects of the thickness of the spacer layer 103 will be described.

Example 4

An RFID tag 100 was produced in a manner similar to Example 1 except that the thickness of the spacer layer 103 was doubled to 1100 μm. Then, the frequency characteristics of the RFID tag 100 were measured.

Example 5

An RFID tag 100 was produced in a manner similar to Example 2 except that the thickness of the spacer layer 103 was doubled to 1100 µm. Then, the frequency characteristics of the RFID tag 100 were measured.

Example 6

An RFID tag 100 was produced in a manner similar to Example 3 except that the thickness of the spacer layer 103 was doubled to 1100 µm. Then, the frequency characteristics of the RFID tag 100 were measured.

Example 7

An RFID tag 100 was produced in a manner similar to Example 1 except that the thickness of the spacer layer 103 was tripled to 1650 µm. Then, the frequency characteristics of the RFID tag 100 were measured.

Example 8

An RFID tag 100 was produced in a manner similar to Example 2 except that the thickness of the spacer layer 103 was tripled to 1650 µm. Then, the frequency characteristics of the RFID tag 100 were measured.

Example 9

An RFID tag 100 was produced in a manner similar to Example 3 except that the thickness of the spacer layer 103 was tripled to 1650 µm. Then, the frequency characteristics of the RFID tag 100 were measured.

FIG. 14 is a diagram illustrating the frequency characteristics of the RFID tags 100 according to Examples 4 to 6. FIG. 14 (a) indicates the frequency characteristics in Example 4, FIG. 14 (b) indicates the frequency characteristics in Example 5, and FIG. 14 (c) indicates the frequency characteristics in Example 6. The horizontal axis and the vertical axis in FIG. 14 are the same as those in FIG. 12. As illustrated in FIG. 14, in Examples 4 to 6, frequency bands in which communication is possible extend further to lower frequency sides than those of Examples 1 to 3, and communication can be sufficiently performed in the UHF band regardless of the thickness of the magnetic sheet 102.

FIG. 15 is a diagram illustrating the frequency characteristics of the RFID tags 100 according to Examples 7 to 9. FIG. 15 (a) indicates the frequency characteristics in Example 7, FIG. 15 (b) indicates the frequency characteristics in Example 8, and FIG. 15 (c) indicates the frequency characteristics in Example 9. The horizontal axis and the vertical axis in FIG. 15 are the same as those in FIG. 12. As illustrated in FIG. 15, in Examples 7 to 9, frequency bands in which communication is possible extend further to lower frequency sides than those of Examples 4 to 6, and communication can be sufficiently performed in the UHF band regardless of the thickness of the magnetic sheet 102.

As indicated by the test results in FIG. 13 through FIG. 15, as the thickness of the spacer layer 103 increases, that is, as the distance from the inlay 101 and the magnetic sheet 102 of the RFID tag 100 to the stainless steel plate, which is the attachment object 200, increases, frequency bands in which communication is possible can extend further to lower frequency sides. That is, the communication performance of the RFID tag 100 can be further improved.

Although specific embodiments have been described above, the present disclosure is not limited to the above-described embodiments. These described embodiments may be modified by a person skilled in the art as long as the features of the present disclosure are included. The arrangement, conditions, and shapes of the structural elements as described in the embodiments are not limited to the arrangement, conditions, and shapes as described, and may be modified as necessary. It should be noted that combination of the elements of the above-described embodiments may be changed as long as no technical contradiction occurs.

This application is based on and claims priority to Japanese Patent Application No. 2019-209103, filed on Nov. 19, 2019, the entire contents of which are incorporated herein by reference.

DESCRIPTION OF THE REFERENCE NUMERALS 1 first element
2 second element
3 third element
4 fourth element
5 fifth element
10 IC chip
20 loop conductor
30 antenna unit
30A conductor unit
30B conductor unit
31 element
40 sheet
100 RFID tag
100-1 RFID tag
100-2 RFID tag
100-3 RFID tag
100-4 RFID tag
100-5 RFID tag
100-6 RFID tag
100-7 RFID tag
100-8 RFID tag
100-9 RFID tag
101 inlay
102 magnetic sheet
103 spacer layer
200 attachment object

The invention claimed is:

1. A radio frequency identification (RFID) tag for attachment to an attachment object, the RFID tag comprising:
   an inlay, the inlay including an IC chip configured to store identification information, a loop conductor connected to the IC chip, and an antenna unit connected to the loop conductor;
   a magnetic sheet laminated on an attachment object side of the inlay; and
   a spacer layer disposed between the magnetic sheet and the attachment object, wherein the spacer layer is formed of a material that is deformable together with the inlay and the magnetic sheet in response to an external force,
   wherein the spacer layer comprises an insulating layer made of a material selected from woven fabric, nonwoven fabric, or inorganic materials.

2. The RFID tag according to claim 1, wherein the attachment object is metal.

3. The RFID tag according to claim 1, wherein the antenna unit includes a linear element, the linear element including two linear-shaped conductors extending away from each other from the loop conductor, and each having a given electrical length that is a multiple of approximately ¼ of a wavelength of a frequency used.

4. The RFID tag according to claim 1, wherein the antenna unit includes a primary element and a secondary element, the primary element including conductors connected to the loop conductor and extending away from each other from the loop conductor, and the secondary element including conductors each connected to the primary element so as to branch from an intermediate portion of the primary element and extending in parallel to the primary element, and wherein one of the primary element and the secondary element has a given electrical length that is a multiple of approximately ¼ of a wavelength of a frequency used, and the other of the primary element and the secondary element has an electrical length that is different from the given electrical length.

5. The RFID tag according to claim 1, wherein the antenna unit includes a primary element and a secondary element, the primary element including conductors connected to the loop conductor and extending away from each other from the loop conductor, and the secondary element including conductors each having a meandering shape and connected to the loop conductor, and wherein one of the primary element and the secondary element has a given electrical length that is a multiple of approximately ¼ of a wavelength of a frequency used, and the other of the primary element and the secondary element has an electrical length that is different from the given electrical length.

6. The RFID tag according to claim 1, wherein the antenna unit includes grid-shaped conductors connected to the loop conductor, extending away from each other from the loop conductor, and each having an electrical length that is a multiple of approximately ¼ of a wavelength of a frequency used.

7. The RFID tag according to claim 3, wherein the antenna unit includes a branch element, the branch element being a conductor connected to the linear element so as to branch from an intermediate portion of the linear element, and extending in parallel to the linear element, and the branch element has an electrical length that is different from the given electrical length.

8. The RFID tag according to claim 3, wherein the antenna unit includes a hook element, the hook element being a hook-shaped conductor disposed at a tip of the linear element and extending in a direction different from an extending direction of the linear element, and the hook element has an electrical length that is different from the given electrical length.

9. The RFID tag according to claim 7, wherein the antenna unit includes a grid element that is a conductor extending from the linear element to the branch element, and the grid element, the linear element, and the branch element together form a grid pattern.

10. The RFID tag according to claim 8, wherein the antenna unit includes a grid element that is a conductor extending from the linear element to the hook element, and the grid element, the linear element, and the hook element together form a grid pattern.

11. The RFID tag according to claim 1, wherein the frequency used is a frequency in an ultra high frequency (UHF) band.

12. The RFID tag according to claim 1, wherein the RFID tag is a wireless tag of a radio wave type.

13. A radio frequency identification (RFID) tag for attachment to an attachment object, the RFID tag comprising:

an inlay, the inlay including an IC chip configured to store identification information, a loop conductor connected to the IC chip, and an antenna unit connected to the loop conductor;

a magnetic sheet laminated on an attachment object side of the inlay; and a spacer layer disposed between the magnetic sheet and the attachment object, wherein the antenna unit includes:

a linear element, the linear element including two linear-shaped conductors extending away from each other from the loop conductor and each having a given electrical length that is a multiple of approximately ¼ of a wavelength of a frequency used; and at least one item selected from a group consisting of:

a branch element, the branch element being a conductor connected to the linear element so as to branch from an intermediate portion of the linear element, and extending in parallel to the linear element, the branch element having an electrical length that is different from the given electrical length; and a hook element, the hook element being a hook-shaped conductor disposed at a tip of the linear element and extending in a direction different from an extending direction of the linear element, the hook element having an electrical length that is different from the given electrical length.

14. A radio frequency identification (RFID) tag for attachment to an attachment object, the RFID tag comprising:

an inlay, the inlay including an IC chip configured to store identification information, a loop conductor connected to the IC chip, and an antenna unit connected to the loop conductor;

a magnetic sheet laminated on an attachment object side of the inlay; and a spacer layer disposed between the magnetic sheet and the attachment object, wherein the antenna unit includes a primary element and a secondary element, the primary element including conductors connected to the loop conductor and extending away from each other from the loop conductor, and the secondary element including conductors each connected to the primary element so as to branch from an intermediate portion of the primary element and extending in parallel to the primary element, and wherein one of the primary element and the secondary element has a given electrical length that is a multiple of approximately ¼ of a wavelength of a frequency used, and the other of the primary element and the secondary element has an electrical length that is different from the given electrical length.

15. A radio frequency identification (RFID) tag for attachment to an attachment object, the RFID tag comprising:

an inlay, the inlay including an IC chip configured to store identification information, a loop conductor connected to the IC chip, and an antenna unit connected to the loop conductor;

a magnetic sheet laminated on an attachment object side of the inlay; and a spacer layer disposed between the magnetic sheet and the attachment object, wherein the antenna unit includes a primary element and a secondary element, the primary element including conductors connected to the loop conductor and extending away from each other from the loop conductor, and the secondary element including conductors each having a meandering shape and connected to the loop conductor, and wherein one of the primary element and the secondary element has a given electrical length that is a multiple of approximately ¼ of a wavelength of a frequency used, and the other of the primary element and the secondary element has an electrical length that is different from the given electrical length.

16. A radio frequency identification (RFID) tag for attachment to an attachment object, the RFID tag comprising:
- an inlay, the inlay including an IC chip configured to store identification information, a loop conductor connected to the IC chip, and an antenna unit connected to the loop conductor;
- a magnetic sheet laminated on an attachment object side of the inlay; and
- a spacer layer disposed between the magnetic sheet and the attachment object,
- wherein the antenna unit includes:
- a linear element, the linear element including two linear-shaped conductors extending away from each other from the loop conductor;
- a hook element, the hook element being a hook-shaped conductor disposed at a tip of the linear element and extending in a direction different from an extending direction of the linear element, and
- a grid element, the grid element being a conductor extending from the linear element to the hook element, wherein the grid element, the linear element, and the hook element together form a grid pattern, and each having an electrical length that is a multiple of approximately ¼ of a wavelength of a frequency used.

* * * * *